United States Patent
Ishizaki

(10) Patent No.: US 8,764,913 B2
(45) Date of Patent: Jul. 1, 2014

(54) SURFACE-COATED METAL NANOPARTICLES, METHOD FOR PRODUCING THE SAME, AND METAL NANOPARTICLE PASTE COMPRISING THE SAME

(75) Inventor: Toshitaka Ishizaki, Aichi-gun (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 329 days.

(21) Appl. No.: 13/211,791

(22) Filed: Aug. 17, 2011

(65) Prior Publication Data

US 2012/0048426 A1 Mar. 1, 2012

(30) Foreign Application Priority Data

Aug. 25, 2010 (JP) ................................ 2010-188094

(51) Int. Cl.
 *B23K 35/34* (2006.01)
(52) U.S. Cl.
 USPC .............................. 148/24; 75/343; 106/31.33
(58) Field of Classification Search
 USPC .............................. 148/24; 75/343; 106/31.33
 IPC ........................ B82Y 5/00,30/00; B22F 1/0018
 See application file for complete search history.

(56) References Cited

U.S. PATENT DOCUMENTS

2008/0251844 A1  10/2008  Nomoto et al.

FOREIGN PATENT DOCUMENTS

| JP | 04146975 A | * | 5/1992 |
| JP | A-4-146975 | | 5/1992 |
| JP | A-2007-294355 | | 11/2007 |
| JP | A-2008-169453 | | 7/2008 |
| JP | 2008270245 A | * | 11/2008 |
| JP | A-2008-270245 | | 11/2008 |
| WO | WO 2004/012884 A1 | | 2/2004 |

OTHER PUBLICATIONS

Japanese Office Action issued in Japanese Application No. 2010-188094 dated Oct. 30, 2012 (w/translation).
Japanese Office Action issued in Japanese Application No. 2010-188094 dated Jan. 7, 2013 (w/translation).
Noboru et al., "Cho-Biryushi Gijutsu Nyumon (Introduction to Superfine Particle Technology)," 1988, pp. 28-29 Ohmsha, Ltd. (with English-language translation).

* cited by examiner

*Primary Examiner* — Weiping Zhu
(74) *Attorney, Agent, or Firm* — Oliff PLC

(57) ABSTRACT

Surface-coated metal nanoparticles comprising:
 metal nanoparticles having an average particle diameter of 1 to 100 nm, and an organic coating film provided on a surface of each of the metal nanoparticles, wherein
 the organic coating film comprises a fatty acid having 8 or more carbon atoms and an aliphatic amine having 8 or more carbon atoms, and
 a molar ratio of the aliphatic amine to the fatty acid is aliphatic amine/fatty acid from 0.001/1 to 0.2/1.

18 Claims, 13 Drawing Sheets

50nm

50nm

100nm

20nm

20nm

SURFACE-COATED METAL NANOPARTICLES, METHOD FOR PRODUCING THE SAME, AND METAL NANOPARTICLE PASTE COMPRISING THE SAME

BACKGROUND OF THE INVENTION

1. Field of the Invention

The present invention relates to surface-coated metal nanoparticles, a method for producing the same, and a metal nanoparticle paste comprising the same. More specifically, the present invention relates to surface-coated metal nanoparticles comprising an organic coating film provided on a surface of each of the metal nanoparticles, a method for producing the same, and a metal nanoparticle paste comprising the same.

2. Related Background Art

Conventionally, Sn—Pb-based solder has been used for bonding electrodes of semiconductor devices and the like. However, from the viewpoint of environmental protection, novel bonding materials such as lead-free solder have recently been demanded. In addition, miniaturization and densification of semiconductor devices have required fine-pitch wiring formation, for which novel wiring formation materials have been demanded. Moreover, in bonding technologies for semiconductor devices and technologies for forming fine-pitch wiring, materials enabling low-temperature bonding or low-temperature wiring formation have been demanded in order to reduce load on semiconductor devices.

Conventionally, nanoparticles of metals such as Ag, Cu, and Ni have attracted attention as the above-described materials for the fine-pitch wiring formation. On pages 28 to 29 of "CHO-BIRYUSHI GIJUTSU NYUMON (Introduction to Superfine Particle Technology)" (Document 1, Ichinose Noboru, Ozaki Yoshiharu, Kashu Seiichiro, published by Ohmsha, Ltd., in July, 1988), it is reported that when such metal nanoparticles have a particle diameter of 20 nm or less, the metal nanoparticles can be sintered at a temperature by far lower than the melting point thereof (sintering temperature: 200° C. or below). For this reason, the metal nanoparticles are expected to be applied to low-temperature bonding for semiconductor devices, low-temperature formation of fine-pitch wiring, and the like.

Various methods such as vapor phase methods and liquid phase methods have been proposed as methods for producing metal nanoparticles. From the viewpoint of allowing mass production with a simple facility at low costs, a method in which metal nanoparticles are formed by reducing a metal ion in a liquid phase has been investigated. However, since metal nanoparticles are extremely likely to aggregate, the metal nanoparticles in an unmodified state are difficult to sufficiently exert the low-temperature sintering characteristics as described above.

For this reason, the aggregation of the metal nanoparticles is generally suppressed by forming an organic coating film comprising a polymer compound such as polyvinylpyrrolidone or polyvinyl alcohol on a surface of each of the metal nanoparticles. However, since such a polymer compound has a relatively high pyrolysis temperature, the following problem is caused. Specifically, if the heating temperature during bonding or during wiring formation is low, the organic coating film components are not sufficiently pyrolyzed, and remain in a bonding portion or in wiring. As a result, bonding properties, thermal conductive properties, or electrical conductive properties are deteriorated. Moreover, since bonding and wiring formation are often conducted in an inert gas atmosphere to prevent oxidation of electrode materials, bonding materials, and wiring materials, the following problem is also caused. Specifically, since the above-described polymer compound is difficult to be pyrolyzed in an inert gas atmosphere, electrical conductivity of wiring and the like and bonding strength of semiconductor devices are deteriorated.

Moreover, International Publication No. WO 2004/012884 (Document 2) discloses a method in which metal nanoparticles having excellent dispersion stability are obtained by subjecting a metal salt to a heat treatment in the presence of an amine compound or in the presence of both an amine compound and a fatty acid. However, even when the metal nanoparticles are used, electrical conductivity of wiring and the like and bonding strength of semiconductor devices are still insufficient.

SUMMARY OF THE INVENTION

The present invention has been made in view of the problems of the above-described conventional technologies, and an object of the present invention is to provide surface-coated metal nanoparticles which are excellent in dispersibility in a lipophilic solvent, and in which an organic coating film is easily pyrolyzed by a heat treatment conducted in an inert gas atmosphere at a low-temperature (specifically, 350° C. or below).

The present inventor has conducted earnest study to achieve the above-described object. As a result, the present inventor has found the following fact. Specifically, metal nanoparticles obtained by the method described in International Publication No. WO 2004/012884 has a high content of the amine compound in a coating film. As a result, when the heating temperature during bonding or during wire formation is low, the amine compound is insufficiently pyrolyzed in an inert gas atmosphere, and remains in the bonding portion or in the wiring, which results in deterioration of bonding properties and electrical properties. In this respect, the present inventor has found that surface-coated metal nanoparticles having a low content of an aliphatic amine in an organic coating film can be obtained by reducing a metal salt in an alcohol-based solvent in the presence of both a fatty acid having 8 or more carbon atoms and an aliphatic amine having 8 or more carbon atoms, the metal salt being insoluble in the alcohol-based solvent. This finding has lead to the completion of the present invention.

Specifically, surface-coated metal nanoparticles of the present invention comprise:

metal nanoparticles having an average particle diameter of 1 to 100 nm, and an organic coating film provided on a surface of each of the metal nanoparticles, wherein the organic coating film comprises a fatty acid having 8 or more carbon atoms and an aliphatic amine having 8 or more carbon atoms, and a molar ratio of the aliphatic amine to the fatty acid is aliphatic amine/fatty acid from 0.001/1 to 0.2/1.

In the surface-coated metal nanoparticles of the present invention, the metal nanoparticles preferably comprise at least one metal atom selected from the group consisting of Au, Pt, Pd, Ag, Rh, Cu, Bi, Pb, Sn, and Ni. In addition, 90% by mass or more of the organic coating film is preferably pyrolyzed in an inert gas atmosphere at a temperature of 350° C. or below.

A metal nanoparticle paste of the present invention comprises the surface-coated metal nanoparticles of the present invention, and an aliphatic hydroxy acid which is liquid at normal temperature. The aliphatic hydroxy acid is preferably ricinoleic acid.

A method for producing surface-coated metal nanoparticles of the present invention comprises: reducing a metal salt in an alcohol-based solvent in the presence of both a fatty acid having 8 or more carbon atoms and an aliphatic amine having 8 or more carbon atoms, the metal salt being insoluble in the alcohol-based solvent, to thereby form nanoparticles of the metal, and form an organic coating film on a surface of each of the metal nanoparticles, the organic coating film comprising the fatty acid and the aliphatic amine.

In the method for producing surface-coated metal nanoparticles of the present invention, the metal salt is preferably at least one selected from the group consisting of carbonates and hydroxides of the metal, and is also preferably a salt of at least one metal selected from the group consisting of Au, Pt, Pd, Ag, Rh, Cu, Bi, Pb, Sn, and Ni.

A molar ratio between the fatty acid and the aliphatic amine present in the alcohol-based solvent is preferably fatty acid/aliphatic amine from 10/90 to 90/10. Meanwhile, the alcohol-based solvent is preferably a polyol, more preferably a glycol, and particularly preferably at least one glycol selected from the group consisting of ethylene glycol, diethylene glycol, triethylene glycol, and polyethylene glycol.

The present invention makes it possible to obtain surface-coated metal nanoparticles which are excellent in dispersibility in a lipophilic solvent, and in which an organic coating film is easily pyrolyzed by a heat treatment conducted in an inert gas atmosphere at a low-temperature (specifically 350° C. or below).

DETAILED DESCRIPTION OF THE PREFERRED EMBODIMENTS

Figure 1:
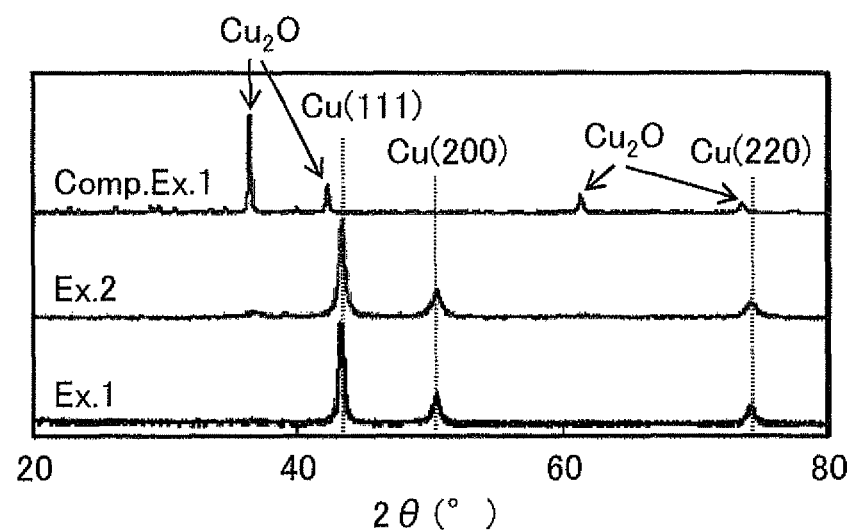
FIG. 1 is a graph showing XRD spectra of fine particles obtained in Examples 1 and 2 and Comparative Example 1.
Figure 2:
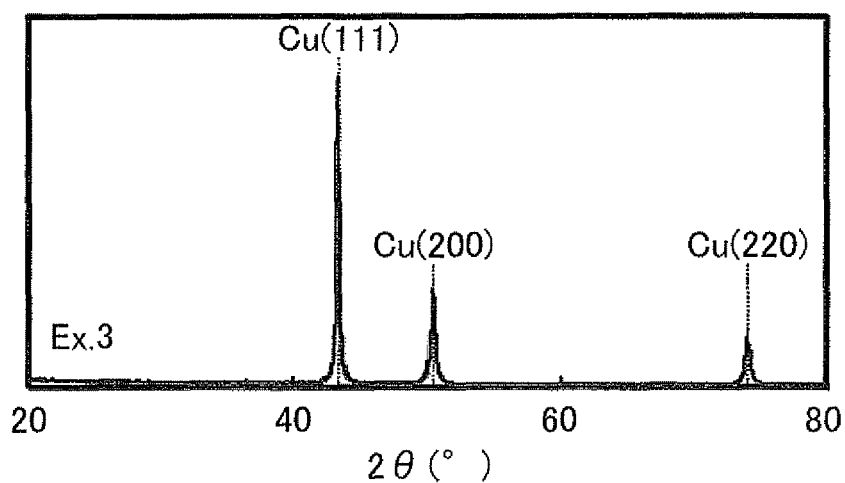
FIG. 2 is a graph showing an XRD spectrum of fine particles obtained in Example 3.
Figure 3:
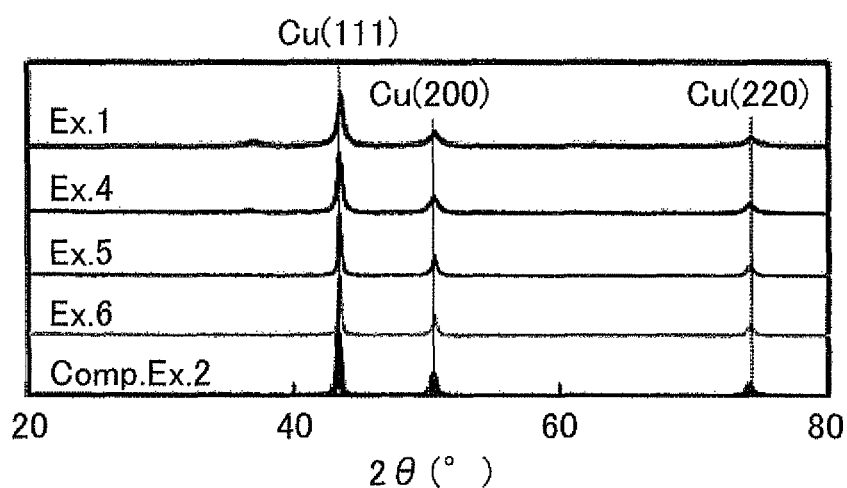
FIG. 3 is a graph showing XRD spectra of fine particles obtained in Examples 1 and 4 to 6, and Comparative Example 2.
Figure 4:
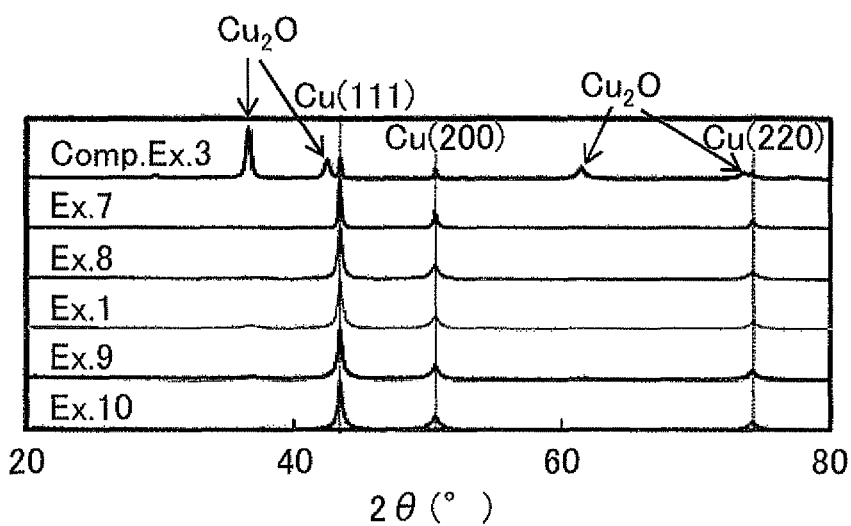
FIG. 4 is a graph showing XRD spectra of fine particles obtained in Examples 1 and 7 to 10, and Comparative Example 3.
Figure 5:
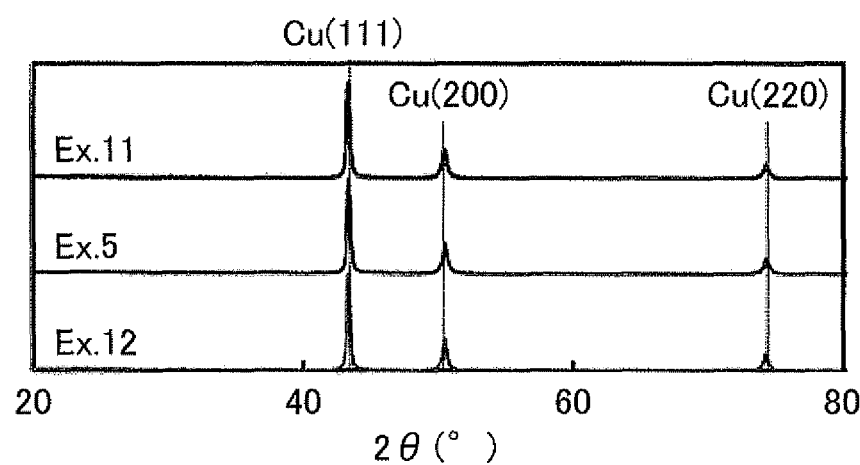
FIG. 5 is a graph showing XRD spectra of fine particles obtained in Examples 5, 11 and 12.
Figure 6:
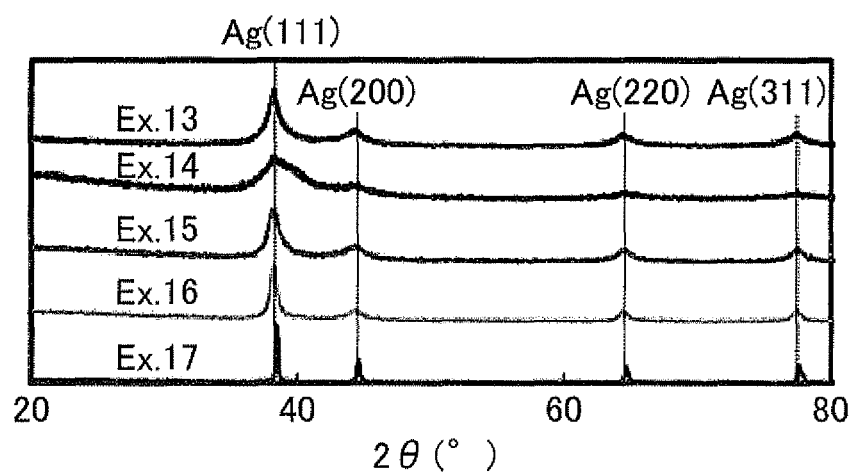
FIG. 6 is a graph showing XRD spectra of fine particles obtained in Examples 13 to 17.
Figure 7:
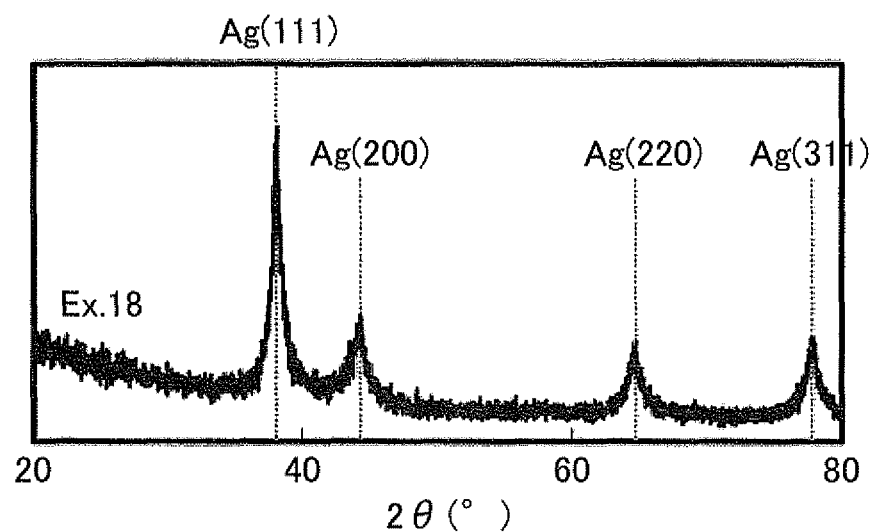
FIG. 7 is a graph showing an XRD spectrum of fine particles obtained in Example 18.
Figure 8:
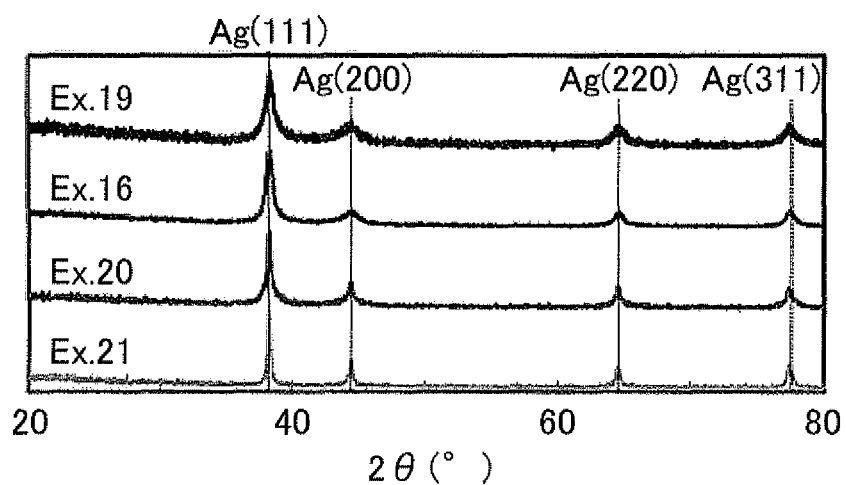
FIG. 8 is a graph showing XRD spectra of fine particles obtained in Examples 16 and 19 to 21.
Figure 9:
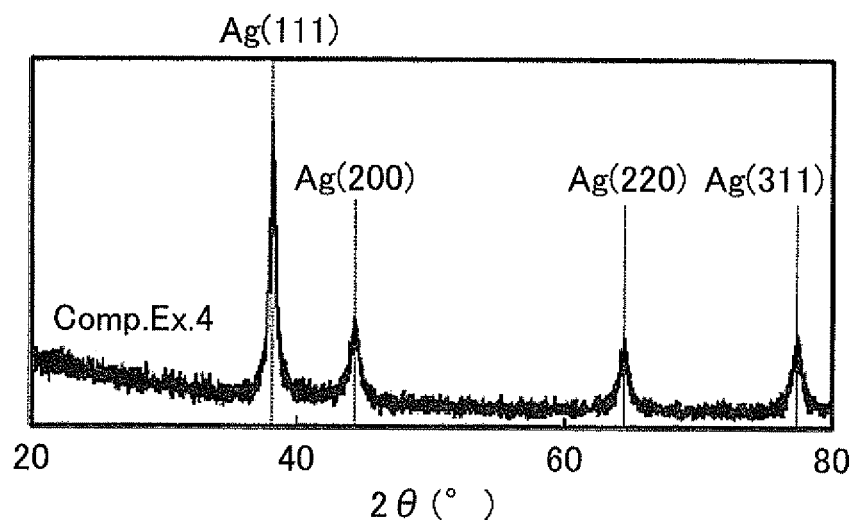
FIG. 9 is a graph showing an XRD spectrum of fine particles obtained in Comparative Example 4.
Figure 10:
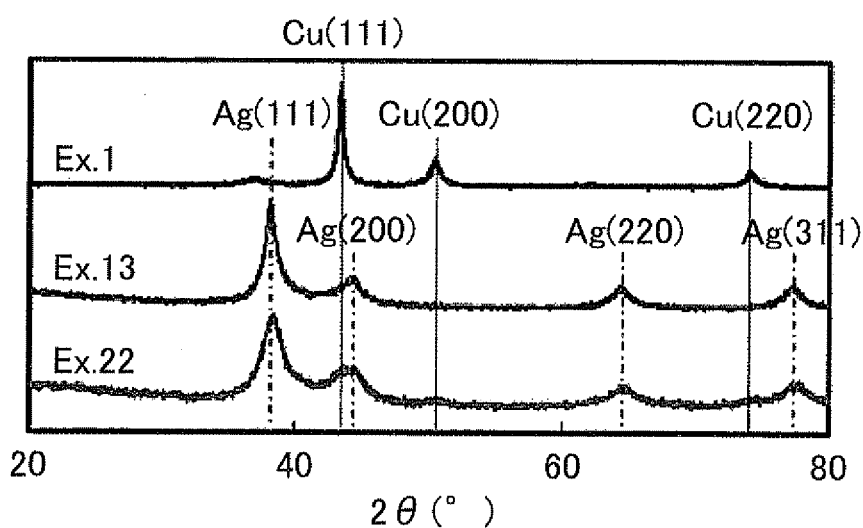
FIG. 10 is a graph showing XRD spectra of fine particles obtained in Examples 1, 13 and 22.
Figure 11:
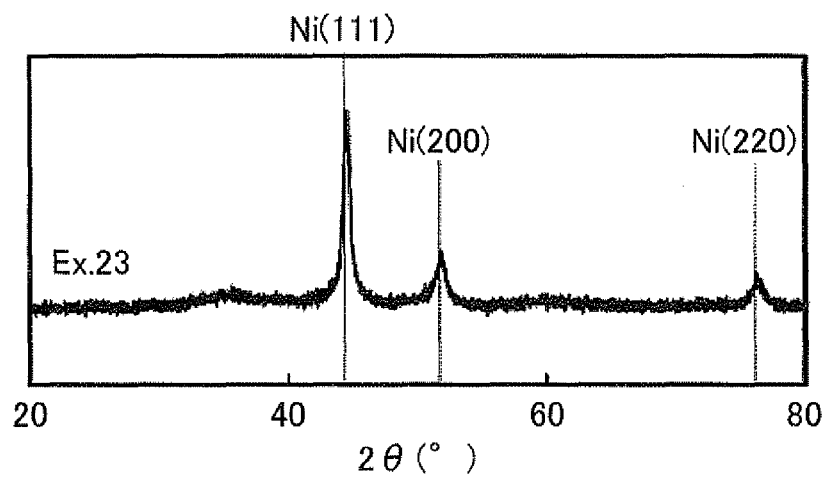
FIG. 11 is a graph showing an XRD spectrum of fine particles obtained in Example 23.

Hereinafter, the present invention will be described in detail on the basis of preferred embodiments thereof.

<Surface-Coated Metal Nanoparticles>

First, a method for producing surface-coated metal nanoparticles of the present invention will be described. The method for producing surface-coated metal nanoparticles of the present invention comprises reducing a metal salt in an alcohol-based solvent in the presence of both a fatty acid having 8 or more carbon atoms and an aliphatic amine having 8 or more carbon atoms, the metal salt being insoluble in the alcohol-based solvent, to thereby form metal nanoparticles, and form an organic coating film on a surface of each of the metal nanoparticles, the organic coating film comprising the fatty acid and the aliphatic amine.

(Alcohol-Based Solvent)

In the method for producing surface-coated metal nanoparticles of the present invention, the metal nanoparticles are formed by reducing a metal salt in an alcohol-based solvent. The alcohol-based solvent acts as a solvent in the reduction reaction, and also acts as a reducing agent. Accordingly, in the method for producing surface-coated metal nanoparticles of the present invention, it is unnecessary to add a reducing agent such as $NaBH_4$ or $N_2H_4$. Hence, the surface-coated metal nanoparticles can be produced by a simplified method.

Moreover, when the alcohol-based solvent acts as a reducing agent, a large amount of the alcohol-based solvent is present around the metal nanoparticles formed by the reduction of the metal salt. Hence, the amount of the aliphatic amine present on the surfaces of the metal nanoparticles is small. Presumably as a result of this, the content of the aliphatic amine in the organic coating film to be described later is reduced. In contrast, when a metal salt is reduced in the presence of both the fatty acid and the aliphatic amine without using an alcohol-based solvent, the aliphatic amine acts as the reducing agent. Hence, a large amount of the aliphatic amine is present on the surfaces of the produced metal nanoparticles. Presumably as a result of this, the content of the aliphatic amine in the organic coating film is increased.

As the alcohol-based solvent used in the method for producing surface-coated metal nanoparticles of the present invention, polyols are preferable, glycols are more preferable, and ethylene glycol, diethylene glycol, triethylene glycol, and polyethylene glycol are particularly preferable, from the viewpoint that a solvent having a boiling point of about 200° C. or higher is desirable for reduction of a base metal such as Cu or Ni. These alcohol-based solvents may be used alone or in combination of two or more kinds. Moreover, such an alcohol-based solvent may be used in combination with a solvent miscible with the alcohol-based solvent (for example, an ether such as dimethyl ether, diethyl ether, diphenyl ether, or tetrahydrofuran; an ester such as ethyl acetate or benzyl acetate; acetone; acetonitrile; dimethylformamide; dimethyl sulfoxide; dimethylacetamide; or the like).

(Metal Salt)

The metal salt used in the method for producing surface-coated metal nanoparticles of the present invention is insoluble in the alcohol-based solvent. Examples of the metal salt include carbonates and hydroxides. These metal salts may be used alone or in combination of two or more kinds.

In the method for producing surface-coated metal nanoparticles of the present invention, a metal ion is generated by pyrolysis of the metal salt in the alcohol-based solvent. In this case, when a metal salt insoluble in the alcohol-based solvent is used, the amount of the metal ion present in the solvent is small. When the metal ion is reduced in such a system, the amount of the particle nuclear produced is small, and the metal nanoparticles are gradually produced. Hence, the organic coating film is likely to be formed on a surface of each of the metal nanoparticles, and is present stably. As a result, the aggregation of the metal nanoparticles can be suppressed sufficiently. Moreover, since the metal salt is gradually dissolved to form the metal nanoparticles, a large amount of the solvent is unnecessary, and the amount of the solvent can be reduced. As a result, the temperature of the solvent can be kept uniform, and a large amount of metal nanoparticles of which particle diameters are uniform can be easily produced.

On the other hand, if a metal salt soluble in the alcohol-based solvent is used, a large amount of a metal ion is generated in the solvent. If the metal ion is reduced in such a system, a large amount of metal nanoparticles are formed at once. If a large amount of metal nanoparticles are formed, the particles aggregate together before the organic coating film is formed on a surface of each of the metal nanoparticles. Hence, the particles are coarsened, and deposited. Moreover, if no organic coating film is formed on the surface, an easily-oxidized metal such as Cu is likely to be oxidized.

As the metal salt used in the method for producing surface-coated metal nanoparticles of the present invention, a salt of at least one metal selected from the group consisting of Au, Pt, Pd, Ag, Rh, Cu, Bi, Pb, Sn, and Ni is preferable, and a salt of at least one metal selected from the group consisting of Ag, Cu, and Ni is more preferable. From the viewpoints of low cost and excellent electromigration resistance of the obtained metal nanoparticles, a copper carbonate or a copper hydroxide is particularly preferable.

(Fatty Acid and Aliphatic Amine)

Each of the fatty acid and the aliphatic amine used in the method for producing surface-coated metal nanoparticles of the present invention has 8 or more carbon atoms. If the number of carbon atoms of the fatty acid or the aliphatic amine is less than 8, the steric hindrance of the fatty acid or the aliphatic amine insufficiently exerted during the formation of the metal nanoparticles, and the thermal stability of the organic coating film is deteriorated. Hence, the metal nanoparticles are coarsened, and it is difficult to obtain metal nanoparticles having an average particle diameter of 100 nm or less. In addition, from the viewpoint that as the numbers of carbon atoms of the fatty acid and the aliphatic amine are increased, the average particle diameter of the obtained metal nanoparticles decreases, the lower limit of the number of carbon atoms of each of the fatty acid and the aliphatic amine is preferably 10 or more, and more preferably 12 or more. Note that the upper limit of the number of carbon atoms of each of the fatty acid and the aliphatic amine is not particularly limited, but is preferably 18 or less, more preferably 16 or less, and particularly preferably 14 or less, from the viewpoint that the organic coating film components are pyrolyzed at a lower-temperature.

In the method for producing surface-coated metal nanoparticles of the present invention, the metal salt is reduced in the alcohol-based solvent in the presence of both the fatty acid and the aliphatic amine. The presence of both the fatty acid and the aliphatic amine leads to formation of a stable organic coating film comprising the fatty acid and the aliphatic amine on the surface of each of the formed metal nanoparticles. This makes it possible to suppress the aggregation of the metal nanoparticles. In contrast, in the presence of only one of the fatty acid and the aliphatic amine, the organic coating film becomes anionic or cationic, and hence the stability of the organic coating film is lowered. As a result, the metal nanoparticles are likely to aggregate. In addition, if no stable organic coating film is formed on the surface, an easily-oxidized metal such as Cu is likely to be oxidized.

The fatty acid is not particularly limited, as long as the fatty acid has the above-described number of carbon atoms. Examples of the fatty acid include fatty acids having a saturated or unsaturated hydrocarbon group. The hydrocarbon group may be linear or branched. Examples of the fatty acid include saturated fatty acids such as octanoic acid, decanoic acid, dodecanoic acid, and stearic acid; and unsaturated fatty acids such as oleic acid.

Meanwhile, the aliphatic amine is not particularly limited, as long as the aliphatic amine has the above-described number of carbon atoms. Examples of the aliphatic amine include aliphatic amines having a saturated or unsaturated hydrocarbon group. The hydrocarbon group may be linear or branched. Examples of the aliphatic amine include alkyl amines such as octylamine, decylamine, dodecylamine, and stearylamine; and alkenylene amines such as oleylamine.

The molar ratio between the fatty acid and the aliphatic amine present in the alcohol-based solvent is not particularly limited, but is preferably fatty acid/aliphatic amine from 10/90 to 90/10. If the fatty acid/aliphatic amine is less than the lower limit, the content of the aliphatic amine in the organic coating film tends to be large. Meanwhile, if the content exceeds the upper limit, the following tendencies are present. Specifically, the particle diameter of the metal nanoparticles tends to be large, so that the average particle diameter exceeds 100 nm; stable organic coating film tends not to be formed, so that the metal nanoparticles aggregate to form a coarse precipitate; and an easily-oxidized metal such as Cu tends to be oxidized.

In the method for producing surface-coated metal nanoparticles of the present invention, the concentration of each of the metal salt, the fatty acid, and the aliphatic amine in the alcohol-based solvent is preferably 0.001 to 10 mol/L, and more preferably 0.01 to 1 mol/L. If the concentration of the metal salt is less than the lower limit, the amount of the metal nanoparticles formed tends to be small. Meanwhile, if the concentration exceeds the upper limit, the time required for the pyrolysis of the metal salt tends to be long. Meanwhile, if the concentration of the fatty acid or the aliphatic amine is less than the lower limit, the organic coating film tends not to be sufficiently formed on the surface of each of the metal nanoparticles. As a result, the metal nanoparticles tend to aggregate, and an easily-oxidized metal such as Cu tends to be oxidized. On the other hand, a concentration exceeding the upper limit is not preferable from a practical viewpoint, because the washing operation for removing the excessive fatty acid or the excessive aliphatic amine is complicated.

The reaction temperature for the reduction is not particularly limited, but is preferably a temperature around the boiling point of the alcohol-based solvent used (more preferably at the boiling point). This makes it possible to keep the temperature of the solvent easily and uniformly, without using a temperature controlling device. As a result, surface-coated metal nanoparticles of which particle diameters are uniform can be obtained. Moreover, the reaction time for the reduction is not particularly limited. The method for producing surface-coated metal nanoparticles of the present invention makes it possible to produce a large amount of surface-coated metal nanoparticles in a reaction time of one hour or less in a high yield of 90% or higher.

In the thus obtained surface-coated metal nanoparticles, the surface of each metal nanoparticle is covered with an organic coating film comprising the fatty acid and the aliphatic amine which have a long-chain hydrocarbon group. Hence, the surface-coated metal nanoparticles are insoluble in an alcohol-based solvent, and are easily precipitated therein. However, the surface-coated metal nanoparticles have high dispersibility in a lipophilic solvent such as hexane or toluene. Accordingly, the surface-coated metal nanoparticles can be easily collected as follows. Specifically, an alcohol-based solvent containing the surface-coated metal nanoparticles is mixed with a lipophilic solvent, so that the surface-coated metal nanoparticles are dispersed in the lipophilic solvent. Then, the alcohol-based solvent and the lipophilic solvent are separated from each other. This method allows the surface-coated metal nanoparticles to be obtained at a recovery of 90% or higher.

Next, the surface-coated metal nanoparticles of the present invention will be described. The surface-coated metal nanoparticles of the present invention comprise metal nanoparticles having an average particle diameter of 1 to 100 nm, and a specific organic coating film provided on a surface of each of the metal nanoparticles. The method for producing such surface-coated metal nanoparticles is not particularly limited, but such surface-coated metal nanoparticles can easily produced by the above-described method for producing surface-coated metal nanoparticles of the present invention.

(Metal Nanoparticles)

The metal nanoparticles according to the present invention have an average particle diameter of 1 to 100 nm. When the average particle diameter is in the above-described range, the metal nanoparticles can be sintered at a low-temperature of 350° C. or below. This makes it possible to use the surface-coated metal nanoparticles of the present invention for an ink or a bonding material used for forming fine-pitch wiring, or the like. Meanwhile, if the average particle diameter exceeds 100 nm, it is difficult to sinter the metal nanoparticles at 350° C. or below.

In addition, as described above, when the surface-coated metal nanoparticles of the present invention are produced by the production method of the present invention, metal nanoparticles of which particle diameters are uniform can be obtained. Such metal nanoparticles of which particle diameters are uniform make it possible to form a dense sinter structure, to form a bonding portion having a high bonding strength, and to form wiring and a bonding portion excellent in thermal conductivity and electrical conductivity.

The metal nanoparticles preferably comprise at least one metal atom selected from the group consisting of Au, Pt, Pd, Ag, Rh, Cu, Bi, Pb, Sn, and Ni, and more preferably comprise at least one metal atom selected from the group consisting of Ag, Cu, and Ni. From the viewpoints of low cost and excellent electromigration resistance, Cu nanoparticles are particularly preferable.

(Organic Coating Film)

The organic coating film according to the present invention comprises a fatty acid having 8 or more carbon atoms and an aliphatic amine having 8 or more carbon atoms. If the number of carbon atoms of the fatty acid or the aliphatic amine is less than 8, the average particle diameter of the metal nanoparticles exceeds 100 nm. This makes it difficult to sinter the metal nanoparticles at 350° C. or below. Examples of the fatty acid and the aliphatic amine include those described as examples for the method for producing surface-coated metal nanoparticles of the present invention.

Moreover, in the organic coating film according to the present invention, the molar ratio of the aliphatic amine to the fatty acid is aliphatic amine/fatty acid from 0.001/1 to 0.2/1. If the proportion of the aliphatic amine is less than the lower limit, the organic coating film is not stably present on the surface of each of the metal nanoparticles, and the metal nanoparticles aggregate to form a coarse precipitate. In addition, the reducibility of the aliphatic amine is insufficiently exerted, so that an easily-oxidized metal such as Cu may be likely to be oxidized during the sintering. On the other hand, if the proportion of the aliphatic amine exceeds the upper limit, it is difficult to pyrolyze the organic coating film in an inert gas atmosphere at a temperature of 350° C. or below. As a result, the organic coating film remains in the bonding portion or in the wiring, so that bonding properties and electrical properties are deteriorated. In addition, the aliphatic amine/fatty acid (molar ratio) is preferably from 0.001/1 to 0.15/1, and more preferably from 0.001/1 to 0.1/1, from the viewpoint that the organic coating film is more surely pyrolyzed in an inert gas atmosphere at a temperature of 350° C. or below.

In the surface-coated metal nanoparticles of the present invention, 90% by mass or more of the organic coating film is preferably pyrolyzed, and 94% by mass or more thereof is more preferably pyrolyzed, in an inert gas atmosphere at a temperature of 350° C. or below. If the amount of the organic coating film pyrolyzed is less than the lower limit, the organic coating film components tend to remain in the bonding portion or the wiring, so that bonding properties and electrical properties are deteriorated. Note that the ratio of the organic coating film pyrolyzed is represented by a ratio of a weight loss between room temperature and 350° C. to a weight loss between room temperature and 500° C., when the organic coating film is heated at a rate of temperature rise of 20 K/min, the latter weight loss corresponding to the mass of the organic coating film.

As described above, in the surface-coated metal nanoparticles of the present invention, the organic coating film is formed which can be pyrolyzed in an inert gas atmosphere at a temperature of 350° C. or below. Hence, even when a base member, a metal electrode, and the metal nanoparticles are formed of an easily-oxidized material such as Cu, the base member, the metal electrode, and the metal nanoparticles can be bonded, or wiring can be formed therefrom, without oxidation thereof.

Moreover, in the surface-coated metal nanoparticles of the present invention, the organic coating film comprising the fatty acid and the aliphatic amine having a lipophilic long-chain hydrocarbon group densely covers the surface of each of the metal nanoparticles. Hence, the surface-coated metal nanoparticles can be dispersed in a lipophilic solvent easily and uniformly.

<Metal Nanoparticle Paste>

A metal nanoparticle paste of the present invention comprises the surface-coated metal nanoparticles of the present invention, and an aliphatic hydroxy acid which is liquid at normal temperature. The aliphatic hydroxy acid is preferably an aliphatic hydroxy acid having 8 or more carbon atoms. From the viewpoints that the aliphatic hydroxy acid is pyrolyzed at 200° C., and that the boiling points of the pyrolysis products are 300° C. or below, ricinoleic acid is more preferable. Such an aliphatic hydroxy acid may be used in combination with a solvent miscible with the aliphatic hydroxy acid.

In the surface-coated metal nanoparticles of the present invention, the surface of each of the metal nanoparticles is coated with the organic coating film comprising the fatty acid having 8 or more carbon atoms and the aliphatic amine having 8 or more carbon atoms. Hence, the lipophilicity of the surface of the particle varies depending on the numbers of carbon atoms of the fatty acid and the aliphatic amine. The aliphatic hydroxy acid used for the metal nanoparticle paste of the present invention has both a hydrocarbon group which is lipophilic, and a hydroxyl group and a carboxyl group which are hydrophilic. Hence, even when the lipophilicity of the surface of each of the surface-coated metal nanoparticles varies, the surface-coated metal nanoparticles can be dispersed in a favorable manner. Hence, irrespective of the numbers of carbon atoms of the fatty acid and the aliphatic amine, it is possible to obtain a metal nanoparticle paste in which the surface-coated metal nanoparticles are uniformly dispersed.

On the other hand, in a case where the surface-coated metal nanoparticles of the present invention are mixed with a hydrophilic solvent such as terpineol, when the numbers of carbon atoms of the fatty acid and the aliphatic amine are small, a metal nanoparticle paste can be obtained in which the surface-coated metal nanoparticles are uniformly dispersed. However, if the numbers of carbon atoms are large, the surface-coated metal nanoparticles and the hydrophilic solvent tend to be separated from each other.

EXAMPLES

Hereinafter, the present invention will be described more specifically on the basis of Examples and Comparative Examples. However, the present invention is not limited to the following Examples.

Example 1

Into a flask, 300 ml of ethylene glycol ($HO(CH_2)_2OH$) was introduced, and 30 mmol of copper carbonate ($CuCO_3.Cu(OH)_2.H_2O$) was added thereto. As a result, copper carbonate hardly dissolved in the ethylene glycol, and was precipitated therein. To this mixture, 30 mmol of oleic acid ($C_{17}H_{33}COOH$) and 30 mmol of oleylamine ($C_{18}H_{35}NH_2$) were added, and then the mixture was refluxed by heating at 198° C. for one hour under a nitrogen gas stream at 1 L/min. As a result, fine particles were formed. The obtained fine particles were dispersed in hexane, and collected therefrom. Then, the fine particles were washed by sequentially adding ethanol and acetone, and then collected by centrifugation (3500 rpm, 20 min), followed by vacuum-drying (50° C., 30 min).

Example 2

Reflux by heating was conducted in the same manner as in Example 1, except that 60 mmol of copper hydroxide ($Cu(OH)_2$) was used instead of copper carbonate. As a result, fine particles were formed. The fine particles were collected, washed, and vacuum-dried in the same manner as in Example 1. Note that copper hydroxide did not dissolve in the ethylene glycol, forming a blue colloid.

Example 3

Reflux by heating was conducted in the same manner as in Example 1, except that 300 ml of diethylene glycol ($HO(CH_2)_2O(CH_2)_2OH$) was used instead of ethylene glycol, and that the heating temperature was changed to 240° C. As a result, fine particles were formed. The fine particles were collected, washed, and vacuum-dried in the same manner as in Example 1. Note that copper carbonate hardly dissolved in the diethylene glycol, and was precipitated therein.

Comparative Example 1

Reflux by heating was conducted in the same manner as in Example 1, except that 60 mmol of copper sulfate ($CuSO_4$) was used instead of copper carbonate. As a result, a coarse precipitate was formed. The precipitate was collected, washed, and vacuum-dried in the same manner as in Example 1. Note that, copper sulfate dissolved in the ethylene glycol, forming a blue solution.

Example 4

Reflux by heating was conducted in the same manner as in Example 1, except that 30 mmol of dodecanoic acid ($C_{11}H_{23}COOH$) was used instead of oleic acid, and that 30 mmol of dodecylamine ($C_{12}H_{25}NH_2$) was used instead of oleylamine. As a result, fine particles were formed. The fine particles were collected, washed, and vacuum-dried in the same manner as in Example 1.

Example 5

Reflux by heating was conducted in the same manner as in Example 1, except that 30 mmol of decanoic acid ($C_9H_{19}COOH$) was used instead of oleic acid, and that 30 mmol of decylamine ($C_{10}H_{21}NH_2$) was used instead of oleylamine. As a result, fine particles were formed. The fine particles were collected, washed, and vacuum-dried in the same manner as in Example 1.

Example 6

Reflux by heating was conducted in the same manner as in Example 1, except that 30 mmol of octanoic acid ($C_7H_{15}COOH$) was used instead of oleic acid, and that 30 mmol of octylamine ($C_8H_{17}NH_2$) was used instead of oleylamine. As a result, fine particles were formed. The fine particles were collected, washed, and vacuum-dried in the same manner as in Example 1.

Comparative Example 2

Reflux by heating was conducted in the same manner as in Example 1, except that 30 mmol of hexanoic acid ($C_5H_{11}COOH$) was used instead of oleic acid, and that 30 mmol of hexylamine ($C_6H_{13}NH_2$) was used instead of oleylamine. As a result, fine particles were formed. The fine particles were collected, washed, and vacuum-dried in the same manner as in Example 1.

Example 7

Reflux by heating was conducted in the same manner as in Example 1, except that the amount of oleic acid added was changed to 54 mmol, and that the amount of oleylamine added was changed to 6 mmol. As a result, fine particles were formed. The fine particles were collected, washed, and vacuum-dried in the same manner as in Example 1.

Example 8

Reflux by heating was conducted in the same manner as in Example 1, except that the amount of oleic acid added was changed to 45 mmol, and that the amount of oleylamine added was changed to 15 mmol. As a result, fine particles were formed. The fine particles were collected, washed, and vacuum-dried in the same manner as in Example 1.

Example 9

Reflux by heating was conducted in the same manner as in Example 1, except that the amount of oleic acid added was changed to 15 mmol, and that the amount of oleylamine added was changed to 45 mmol. As a result, fine particles were formed. The fine particles were collected, washed, and vacuum-dried in the same manner as in Example 1.

Example 10

Reflux by heating was conducted in the same manner as in Example 1, except that the amount of oleic acid added was changed to 6 mmol, and that the amount of oleylamine added was changed to 54 mmol. As a result, fine particles were formed. The fine particles were collected, washed, and vacuum-dried in the same manner as in Example 1.

Comparative Example 3

Reflux by heating was conducted in the same manner as in Example 1, except that the amount of oleic acid added was changed to 60 mmol, and that no oleylamine was added. As a result, a coarse precipitate was formed. The precipitate was collected, washed, and vacuum-dried in the same manner as in Example 1.

Example 11

Reflux by heating was conducted in the same manner as in Example 5, except that the amount of decanoic acid added was changed to 45 mmol, and that the amount of decylamine added was changed to 15 mmol. As a result, fine particles were formed. The fine particles were collected, washed, and vacuum-dried in the same manner as in Example 1.

Example 12

Reflux by heating was conducted in the same manner as in Example 5, except that the amount of decanoic acid added was changed to 15 mmol, and that the amount of decylamine added was changed to 45 mmol. As a result, fine particles were formed. The fine particles were collected, washed, and vacuum-dried in the same manner as in Example 1.

Example 13

Reflux by heating was conducted in the same manner as in Example 1, except that 30 mmol of silver carbonate ($Ag_2CO_3$) was used instead of copper carbonate. As a result, fine particles were formed. The fine particles were collected, washed, and vacuum-dried in the same manner as in Example 1. Note that silver carbonate hardly dissolved in the ethylene glycol, and was precipitated therein.

Example 14

Reflux by heating was conducted in the same manner as in Example 13, except that 30 mmol of stearic acid ($C_{17}H_{35}COOH$) was used instead of oleic acid, and that 30 mmol of stearylamine ($C_{18}H_{17}NH_2$) was used instead of oleylamine. As a result, fine particles were formed. The fine particles were collected, washed, and vacuum-dried in the same manner as in Example 1.

Example 15

Reflux by heating was conducted in the same manner as in Example 13, except that 30 mmol of dodecanoic acid ($C_{11}H_{23}COOH$) was used instead of oleic acid, and that 30 mmol of dodecylamine ($C_{12}H_{25}NH_2$) was used instead of oleylamine. As a result, fine particles were formed. The fine particles were collected, washed, and vacuum-dried in the same manner as in Example 1.

Example 16

Reflux by heating was conducted in the same manner as in Example 13, except that 30 mmol of decanoic acid ($C_9H_{19}COOH$) was used instead of oleic acid, and that 30 mmol of decylamine ($C_{10}H_{21}NH_2$) was used instead of oleylamine. As a result, fine particles were formed. The fine particles were collected, washed, and vacuum-dried in the same manner as in Example 1.

Example 17

Reflux by heating was conducted in the same manner as in Example 13, except that 30 mmol of octanoic acid ($C_7H_{15}COOH$) was used instead of oleic acid, and that 30 mmol of octylamine ($C_8H_{17}NH_2$) was used instead of oleylamine. As a result, fine particles were formed. The fine particles were collected, washed, and vacuum-dried in the same manner as in Example 1.

Example 18

Reflux by heating was conducted in the same manner as in Example 13, except that 30 mmol of erucic acid ($C_{21}H_{41}COOH$) was used instead of oleic acid. As a result, fine particles were formed. The fine particles were collected, washed, and vacuum-dried in the same manner as in Example 1.

Example 19

Reflux by heating was conducted in the same manner as in Example 16, except that the amount of decanoic acid added was changed to 45 mmol, and that the amount of decylamine added was changed to 15 mmol. As a result, fine particles were formed. The fine particles were collected, washed, and vacuum-dried in the same manner as in Example 1.

Example 20

Reflux by heating was conducted in the same manner as in Example 16, except that the amount of decanoic acid added was changed to 15 mmol, and that the amount of decylamine added was changed to 45 mmol. As a result, fine particles were formed. The fine particles were collected, washed, and vacuum-dried in the same manner as in Example 1.

Example 21

Reflux by heating was conducted in the same manner as in Example 16, except that the amount of decanoic acid added was changed to 6 mmol, and that the amount of decylamine added was changed to 54 mmol. As a result, fine particles were formed. The fine particles were collected, washed, and vacuum-dried in the same manner as in Example 1.

Comparative Example 4

Into a flask, 23.2 mmol of silver carbonate ($Ag_2CO_3$) and 42.7 mmol of dodecylamine (laurylamine, $C_{12}H_{25}NH_2$) were introduced. To this, 46.7 mmol of octanoic acid ($C_7H_{15}COOH$) was added. The mixture was heated in a nitrogen atmosphere at 150° C. for 5 hours. As a result, fine particles were formed. The dispersion liquid containing the fine particles was cooled to 70° C., and then washed by adding methanol. Then, the fine particles were collected by filtration, and vacuum-dried (50° C., 30 min).

Example 22

Reflux by heating was conducted in the same manner as in Example 1, except that 18 mmol of copper carbonate ($CuCO_3.Cu(OH)_2.H_2O$) and 12 mmol of silver carbonate ($Ag_2CO_3$) were used instead of 30 mmol of copper carbonate.

As a result, fine particles were formed. The fine particles were collected, washed, and vacuum-dried in the same manner as in Example 1.

Example 23

Reflux by heating was conducted in the same manner as in Example 1, except that 20 mmol of nickel carbonate ($NiCO_3.2Ni(OH)_2.4H_2O$) was used instead of copper carbonate. As a result, fine particles were formed. The fine particles were collected, washed, and vacuum-dried in the same manner as in Example 1. Note that nickel carbonate hardly dissolved in the ethylene glycol, and was precipitated therein.

<Identification of Metal Component and Measurement of Average Particle Diameter of Metal Nanoparticles>

Powder X-ray diffraction (XRD) measurement was conducted on the obtained fine particles and coarse precipitates by use of an X-ray diffraction apparatus ("fully automatic and multipurpose X-ray diffraction apparatus D8 ADVANCE" manufactured by Bruker), under the following conditions: X-ray source: CuKα radiation ($\lambda$=0.15418 nm); acceleration voltage: 35 kV; and acceleration current: 40 mA. FIGS. 1 to 11 show the obtained XRD spectra.

From each of these XRD spectra, a metal component was identified. For the fine particles obtained in Examples 1 to 23, Comparative Example 2, and Comparative Example 4, the average particle diameter of the metal nanoparticles was determined from the half width of the strongest peak (the peak corresponding to Cu(111), Ag(111), or Ni(111)) in the XRT spectrum by use of the Scherrer's equation. Tables 1 to 5 show the results.

TABLE 1

|  |  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|
| Solvent |  | Ethylene glycol | Ethylene glycol | Diethylene glycol | Ethylene glycol | Ethylene glycol | Ethylene glycol | Ethylene glycol | Ethylene glycol |
| Metal salt |  | Copper carbonate | Copper hydroxide | Copper carbonate | Copper carbonate | Copper carbonate | Copper carbonate | Copper sulfate | Copper carbonate |
| Fatty acid | Kind | Oleic acid | Oleic acid | Oleic acid | Dodecanoic acid | Decanoic acid | Octanoic acid | Oleic acid | Hexanoic acid |
|  | Hydrocarbon group | C18 (unsaturated) | C18 (unsaturated) | C18 (unsaturated) | C12 (saturated) | C10 (saturated) | C8 (saturated) | C18 (unsaturated) | C6 (saturated) |
| Aliphatic amine | Kind | Oleylamine | Oleylamine | Oleylamine | Dodecylamine | Decylamine | Octylamine | Oleylamine | Hexylamine |
|  | Hydrocarbon group | C18 (unsaturated) | C18 (unsaturated) | C18 (unsaturated) | C12 (saturated) | C10 (saturated) | C8 (saturated) | C18 (unsaturated) | C6 (saturated) |
| Molar ratio in synthesis (acid/amine) |  | 50/50 | 50/50 | 50/50 | 50/50 | 50/50 | 50/50 | 50/50 | 50/50 |
| Metal component (Main component) |  | Cu | Cu | Cu | Cu | Cu | Cu | $Cu_2O$ | Cu |
| Average particle diameter (nm) |  | 20.8 | 21.3 | 61 | 26.6 | 66 | 71.5 | — | >100 |

TABLE 2

|  |  | Ex. 7 | Ex. 8 | Ex. 9 | Ex. 10 | Ex. 11 | Ex. 12 | Comp. Ex. 3 |
|---|---|---|---|---|---|---|---|---|
| Solvent |  | Ethylene glycol | Ethylene glycol | Ethylene glycol | Ethylene glycol | Ethylene glycol | Ethylene glycol | Ethylene glycol |
| Metal salt |  | Copper carbonate | Copper carbonate | Copper carbonate | Copper carbonate | Copper carbonate | Copper carbonate | Copper carbonate |
| Fatty acid | Kind | Oleic acid | Oleic acid | Oleic acid | Oleic acid | Decanoic acid | Decanoic acid | Oleic acid |
|  | Hydrocarbon group | C18 (unsaturated) | C18 (unsaturated) | C18 (unsaturated) | C18 (unsaturated) | C10 (saturated) | C10 (saturated) | C18 (unsaturated) |
| Aliphatic amine | Kind | Oleylamine | Oleylamine | Oleylamine | Oleylamine | Decylamine | Decylamine | — |
|  | Hydrocarbon group | C18 (unsaturated) | C18 (unsaturated) | C18 (unsaturated) | C18 (unsaturated) | C10 (saturated) | C10 (saturated) | — |

TABLE 2-continued

|  | Ex. 7 | Ex. 8 | Ex. 9 | Ex. 10 | Ex. 11 | Ex. 12 | Comp. Ex. 3 |
|---|---|---|---|---|---|---|---|
| Molar ratio in synthesis (acid/amine) | 90/10 | 75/25 | 25/75 | 10/90 | 75/25 | 25/75 | 100/0 |
| Metal component (Main component) | Cu | Cu | Cu | Cu | Cu | Cu | $Cu_2O$ |
| Average particle diameter (nm) | 23.3 | 26.9 | 25.5 | 27.5 | 59.5 | 76.8 | — |

TABLE 3

|  |  | Ex. 13 | Ex. 14 | Ex. 15 | Ex. 16 | Ex. 17 | Ex. 18 |
|---|---|---|---|---|---|---|---|
| Solvent |  | Ethylene glycol | Ethylene glycol | Ethylene glycol | Ethylene glycol | Ethylene glycol | Ethylene glycol |
| Metal salt |  | Silver carbonate | Silver carbonate | Silver carbonate | Silver carbonate | Silver carbonate | Silver carbonate |
| Fatty acid | Kind | Oleic acid | Stearic acid | Dodecanoic acid | Decanoic acid | Octanoic acid | Erucic acid |
|  | Hydrocarbon group | C18 (unsaturated) | C18 (saturated) | C12 (saturated) | C10 (saturated) | C8 (saturated) | C22 (unsaturated) |
| Aliphatic amine | Kind | Oleylamine | Stearylamine | Dodecylamine | Decylamine | Octylamine | Oleylamine |
|  | Hydrocarbon group | C18 (unsaturated) | C18 (saturated) | C12 (saturated) | C10 (saturated) | C8 (saturated) | C18 (unsaturated) |
| Molar ratio in synthesis (acid/amine) |  | 50/50 | 50/50 | 50/50 | 50/50 | 50/50 | 50/50 |
| Metal component (Main component) |  | Ag | Ag | Ag | Ag | Ag | Ag |
| Average particle diameter (nm) |  | 6.7 | 3.2 | 8.5 | 16.4 | 74.4 | 9.9 |

TABLE 4

|  |  | Ex. 19 | Ex. 20 | Ex. 21 | Comp. Ex. 4 |
|---|---|---|---|---|---|
| Solvent |  | Ethylene glycol | Ethylene glycol | Ethylene glycol | — |
| Metal salt |  | Silver carbonate | Silver carbonate | Silver carbonate | Silver carbonate |
| Fatty acid | Kind | Decanoic acid | Decanoic acid | Decanoic acid | Octanoic acid |
|  | Hydrocarbon group | C10 (saturated) | C10 (saturated) | C10 (saturated) | C8 (saturated) |
| Aliphatic amine | Kind | Decylamine | Decylamine | Decylamine | Dodecylamine |
|  | Hydrocarbon group | C10 (saturated) | C10 (saturated) | C10 (saturated) | C12 (saturated) |
| Molar ratio in synthesis (acid/amine) |  | 75/25 | 25/75 | 10/90 | 52/48 |
| Metal component (Main component) |  | Ag | Ag | Ag | Ag |
| Average particle diameter (nm) |  | 11.4 | 27.1 | 75.1 | 32.2 |

TABLE 5

|  |  | Ex. 1 | Ex. 13 | Ex. 22 | Ex. 23 |
|---|---|---|---|---|---|
| Solvent |  | Ethylene glycol | Ethylene glycol | Ethylene glycol | Ethylene glycol |
| Metal salt |  | Copper carbonate | Silver carbonate | Copper carbonate + Silver carbonate | Nickel carbonate |
| Fatty acid | Kind | Oleic acid | Oleic acid | Oleic acid | Oleic acid |
|  | Hydrocarbon group | C18 (unsaturated) | C18 (unsaturated) | C18 (unsaturated) | C18 (unsaturated) |
| Aliphatic amine | Kind | Oleylamine | Oleylamine | Oleylamine | Oleylamine |
|  | Hydrocarbon group | C18 (unsaturated) | C18 (unsaturated) | C18 (unsaturated) | C18 (unsaturated) |

TABLE 5-continued

|  | Ex. 1 | Ex. 13 | Ex. 22 | Ex. 23 |
|---|---|---|---|---|
| Molar ratio in synthesis (acid/amine) | 50/50 | 50/50 | 50/50 | 50/50 |
| Metal component (Main component) | Cu | Ag | Ag + Cu | Ni |
| Average particle diameter (nm) | 20.8 | 6.7 | 6.1 | 15.5 |

As is apparent from the results shown in Tables 1 to 5, it was found that metal nanoparticles having an average particle diameter of 3.2 to 76.8 nm were obtained by reducing a metal salt insoluble in a glycol, such as copper carbonate, copper hydroxide, silver carbonate, or nickel carbonate, in a glycol such as ethylene glycol or diethylene glycol in the presence of both a fatty acid having 8 to 22 carbon atoms and an aliphatic amine having 8 to 18 carbon atoms (Examples 1 to 23). In particular, as is apparent from the results shown in Table 5, it was also found that silver-copper composite metal nanoparticles could be formed as the metal nanoparticles (Example 22). Moreover, since Ni nanoparticles could be also formed (Example 23), it has been shown that nanoparticles of metals more noble than Ni (for example, Sn, Pb, Bi, Cu, Ag, Pd, Pt, and Au) can be formed. Moreover, as is apparent from the results shown in Tables 1 and 3, it was found that the average particle diameter of the metal nanoparticles tended to be smaller, as the numbers of carbon atoms of the fatty acid and the aliphatic amine were increased.

Meanwhile, when copper sulfate, which is soluble in glycol, was used as the metal salt (Comparative Example 1), coarse copper oxide was formed, and it was difficult to form copper nanoparticles. When no aliphatic amine was used (Comparative Example 3), coarse copper oxide was formed, and it was difficult to form copper nanoparticles. Moreover, when the fatty acid having 6 carbon atoms and the aliphatic amine having 6 carbon atoms were used (Comparative Example 2), it was difficult to prepare copper nanoparticles having an average particle diameter of 100 nm or less. Note that, it was found that, when silver carbonate was reduced in the presence of both a fatty acid and an aliphatic amine without using an alcohol-based solvent according to the method described in International Publication No. WO 2004/012884, (Comparative Example 4), silver nanoparticles having an average particle diameter of approximately 30 nm were formed.

<Analysis of Component of Organic Coating Film>

Figure 12:
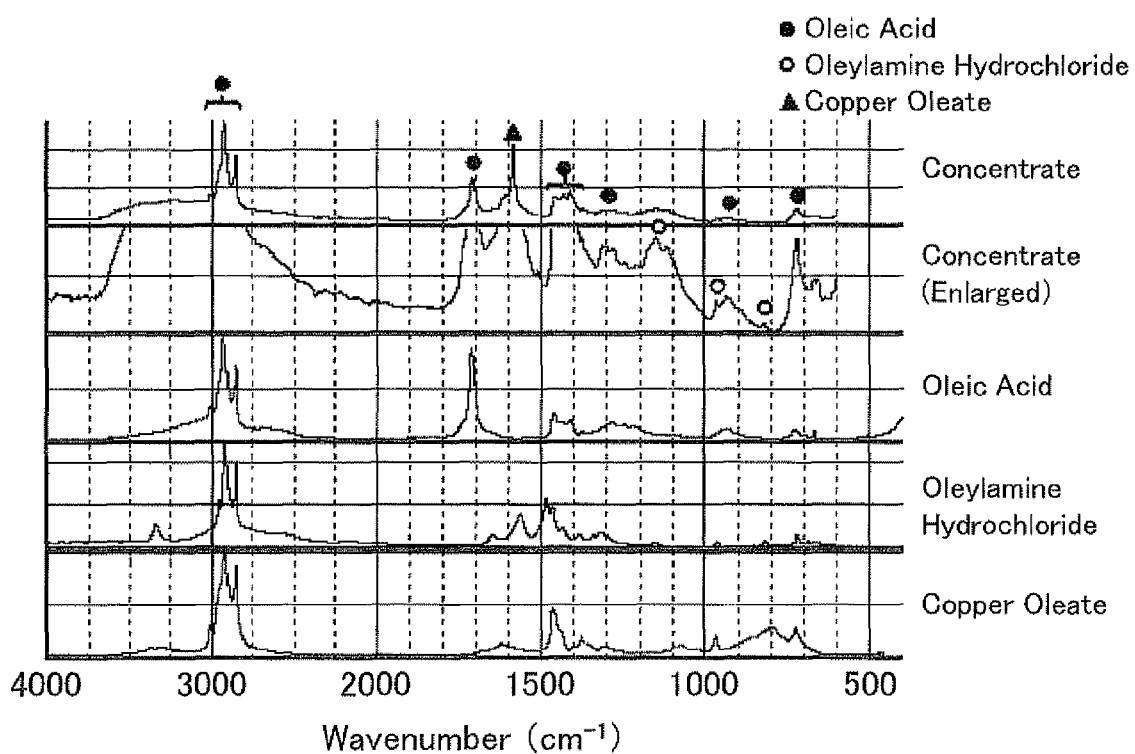
FIG. 12 is a graph showing IR spectrum of organic coating film components extracted from the fine particles obtained in Example 1.

The fine particles obtained in Examples 1 to 23, and Comparative Example 4 were dispersed in hydrochloric acid, and the released organic coating film components were extracted with ethanol, and then vacuum-concentrated. The obtained concentrate was measured for an infrared absorption spectrum (IR spectrum) by use of a microscopic infrared spectrometer ("MAGNA 760" manufactured by Nicolet). As a result, it was found that each concentrate contained the corresponding fatty acid and a hydrochloride of the corresponding aliphatic amine. Note that, FIG. 12 shows an IR spectrum of organic film components extracted from the fine particles obtained in Example 1, as an example of the IR spectra of the extracted organic coating film components.

Figure 13:
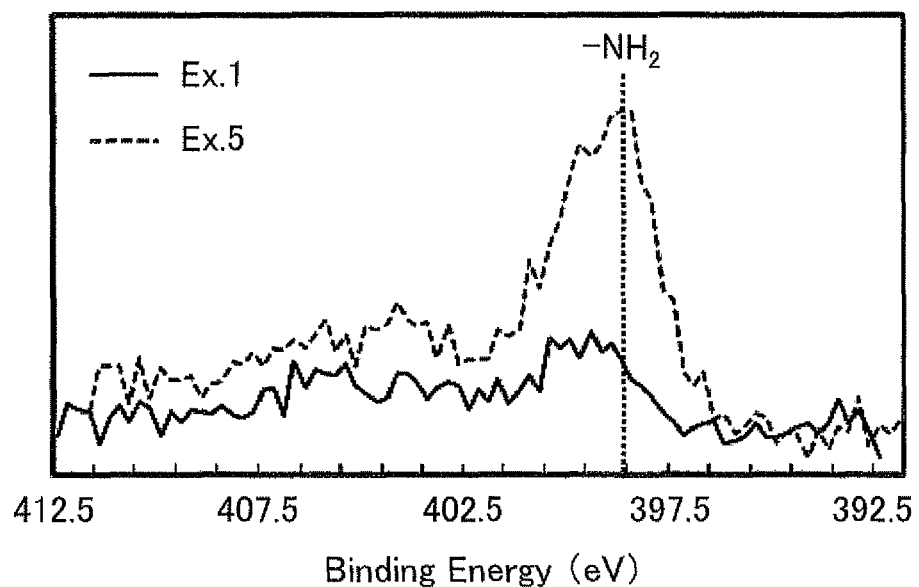
FIG. 13 is a graph showing XPS (N1s spectra) of the fine particles obtained in Examples 1 and 5.
Figure 14:
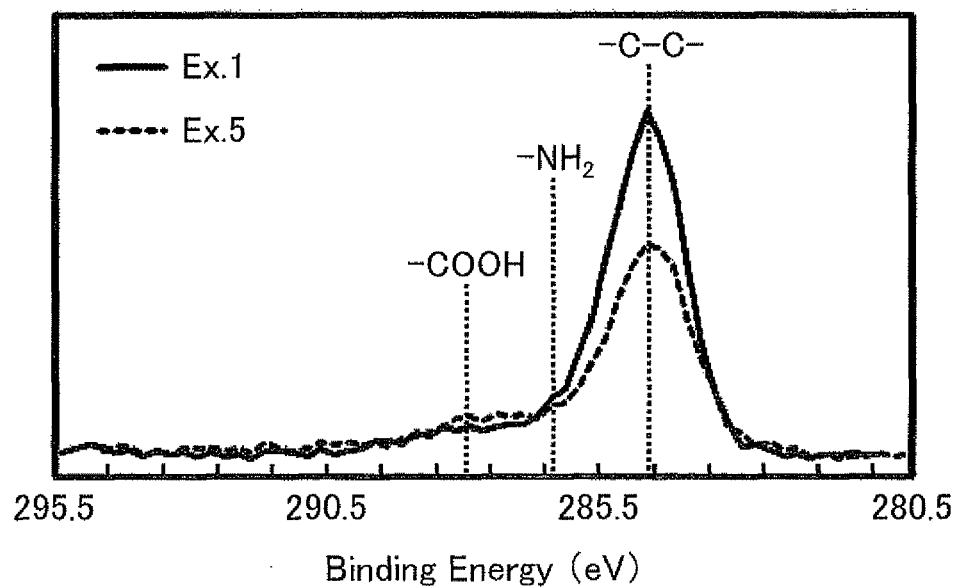
FIG. 14 is a graph showing XPS (C1s spectra) of the fine particles obtained in Examples 1 and 5.

The fine particles obtained in Examples 1 to 23, and Comparative Example 4 were measured for an X-ray photoelectron spectrum (XPS) by use of an X-ray photoelectron spectrometer ("Quantera SXM" manufactured by ULVAC-PHI, Incorporated) under the following conditions: X-ray source: monochromatic AlKα radiation; photoelectron take-Off angle: 45°; analysis region: approximately 200 µmφ; pass energy: 26 eV; energy step: 0.1 eV; and energy correction: 285 eV (C1s). As a result, for the fine particles in each case, the presence of an amino group was detected from an N1s spectrum, and the presence of a carboxyl group was detected from a C1s spectrum. Note that, as examples of the XPS, FIG. 13 shows the N1s spectra of the fine particles obtained in Example 1 and Example 5, and FIG. 14 shows the C1s spectra of the fine particles obtained in Example 1 and Example 5.

From the above-described results, it was found that, in the fine particles obtained in Examples 1 to 23 and Comparative Example 4, an organic coating film comprising the corresponding fatty acid and the corresponding aliphatic amine was formed on a surface of each of the metal nanoparticles.

Here, in the case of the fine particles in which the fatty acid and the aliphatic amine each had 10 or less carbon atoms, the ratio of the intensity at a binding energy of 286.37 eV (—$NH_2$) to that at a binding energy of 287.96 eV (—COOH) was determined from the obtained C1s spectrum, and the intensity ratio was regarded as the molar ratio of the aliphatic amine to the fatty acid in the organic coating film.

Meanwhile, in the case of the fine particles in which the fatty acid and the aliphatic amine each had 11 or more carbon atoms, the peak intensity of —C—C— was so high that the waveform separation of the peak of —C—C— from the peak of —$NH_2$ was difficult to be conducted. Hence, the molar ratio of the aliphatic amine to the fatty acid in the organic coating film was determined by the following method. Specifically, 400 mg of the obtained fine particles were added to 5 ml of concentrated hydrochloric acid, followed by stirring for 24 hours. Thus, organic coating film components were released. The fatty acid in the hydrochloric acid solution was extracted with 20 ml of chloroform, and thus a chloroform extraction liquid containing the fatty acid was obtained. Moreover, 1N NaOH was added dropwise to the hydrochloric acid solution (containing the metal nanoparticles and the aliphatic amine) remaining after the chloroform extraction to thereby adjust the pH to 11. Thereafter, the aliphatic amine in this hydrochloric acid solution was extracted with 20 ml of chloroform. Thus, a chloroform extraction liquid containing the aliphatic amine was obtained. Thereafter, the obtained chloroform extraction liquid containing the fatty acid and the obtained chloroform extraction liquid containing the aliphatic amine were mixed with each other, dehydrated by adding 20 g of $Na_2SO_3$, and further concentrated to 2 ml by use of an evaporator. The fatty acid in the obtained liquid concentrate was quantitatively determined by gas chromatography (GC), and the aliphatic amine therein was quantitatively determined with a high-performance liquid chromatography mass spectrometer (LC/MS). Thus, the molar ratio of the aliphatic amine to the fatty acid in the organic coating film was determined. Note that the GC analysis and the LC/MS analysis were carried out under the following conditions.

(GC Analysis Conditions)
Analyzer: "HP6890" manufactured by Agilent Technologies, Inc.
Column: HP-INNOWAX (20 m×0.18 mm×0.18 μm)
Detector: hydrogen flame ionization detector (FID)
Carrier gas: He (1.5 ml/min)
Injection temperature: 260° C.
Detector temperature: 260° C.
Injection amount: 1 μl
(LC/MS Analysis Conditions)
LC analyzer: "1200 series LC" manufactured by Agilent Technologies, Inc.
Column: ZIC-HILIC (2.1 mm×150 mm×5 μm)
Mobile phase: water/acetonitrile=5/95 (containing 0.1% of formic acid)
Flow rate: 0.2 ml/min
Injection amount: 1 μl
MS measurement apparatus: "G6410A" manufactured by Agilent Technologies, Inc.
Ionization method: electrospray ionization (ESI) method
Polarity: positive.

Figure 15:
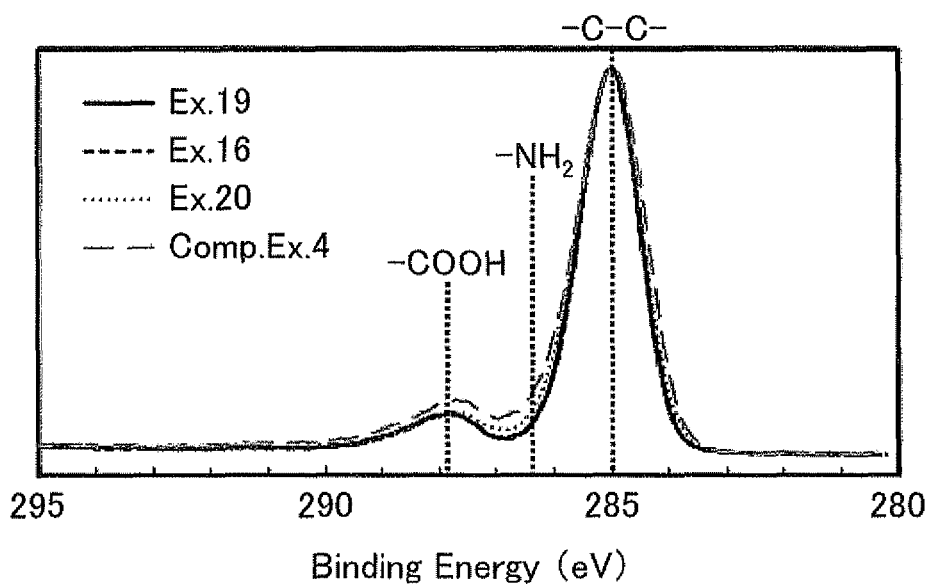
FIG. 15 is a graph showing XPS (C1s spectra) of the fine particles obtained in Examples 16, 19 and 20, and Comparative Example 4.

Table 6 shows the molar ratio between the fatty acid and the aliphatic amine in the organic coating film of the fine particles obtained in Examples 1, 8, 9, 13, 16, 19, and 20, and Comparative Example 4. Moreover, FIG. 15 shows C1s spectra of the fine particles obtained in Examples 16, 19, and 20 and Comparative Example 4.

amine without using an alcohol-based solvent according to the method described in International Publication No. WO 2004/012884 (Comparative Example 4), an organic coating film comprising 0.26 moles of the aliphatic amine per mole of the fatty acid was formed on a surface of each of the metal nanoparticles.

<Electron Microscopic Observation>

The obtained fine particles were dispersed in toluene. The dispersion liquid was placed dropwise onto a Cu microgrid which was provided with an elastic carbon support film (a polymer material film (15 to 20 nm in thickness) and a carbon film (20 to 25 nm in thickness)) (manufactured by Okenshoji Co., Ltd.), and was air-dried to thereby prepare a sample for observation. The sample for observation was observed with a transmission electron microscope (TEM, "JEM-2000 EX" manufactured by JEOL Ltd.) at an acceleration voltage of 200 kV.

Figure 16:
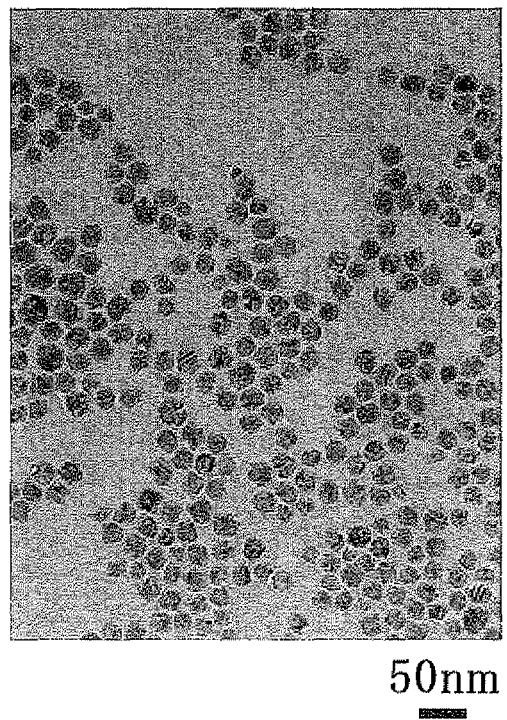
FIG. 16 is a transmission electron microphotograph showing the fine particles obtained in Example 1.
Figure 17:
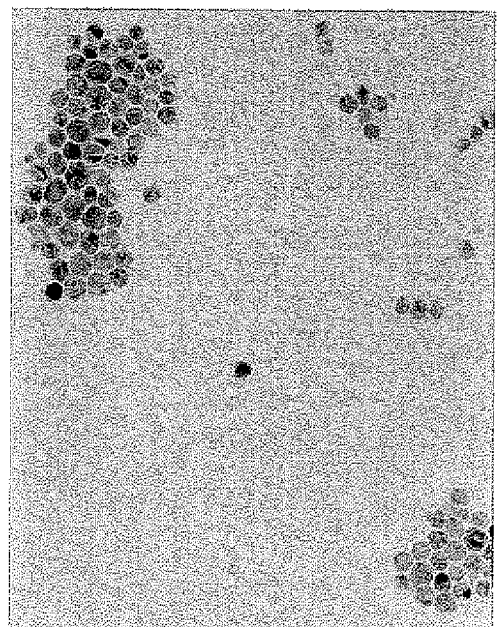
FIG. 17 is a transmission electron microphotograph showing the fine particles obtained in Example 2.

As a result, it was found that the fine particles obtained in Examples 1 to 23 (i.e., the surface-coated metal nanoparticles of the present invention) comprised metal nanoparticles of which particle diameters were uniform and were almost equal to the average particle diameter of the metal nanoparticles determined from the XRD peak. For example, FIGS. 16 and 17 show TEM photographs of the surface-coated metal nanoparticles obtained in Examples 1 and 2, respectively. As is apparent from these results, it was found that the surface-coated metal nanoparticles obtained in Examples 1 and 2 had

TABLE 6

| | | Ex. 1 | Ex. 8 | Ex. 9 | Ex. 13 | Ex. 16 | Ex. 19 | Ex. 20 | Comp. Ex. 4 |
|---|---|---|---|---|---|---|---|---|---|
| Solvent | | Ethylene glycol | Ethylene glycol | Ethylene glycol | Ethylene glycol | Ethylene glycol | Ethylene glycol | Ethylene glycol | — |
| Metal salt | | Copper carbonate | Copper carbonate | Copper carbonate | Silver carbonate | Silver carbonate | Silver carbonate | Silver carbonate | Silver carbonate |
| Fatty acid | Kind | Oleic acid | Oleic acid | Oleic acid | Oleic acid | Decanoic acid | Decanoic acid | Decanoic acid | Octanoic acid |
| | Hydrocarbon group | C18 (unsaturated) | C18 (unsaturated) | C18 (unsaturated) | C18 (unsaturated) | C10 (saturated) | C10 (saturated) | C10 (saturated) | C8 (saturated) |
| Aliphatic amine | Kind | Oleylamine | Oleylamine | Oleylamine | Oleylamine | Decylamine | Decylamine | Decylamine | Dodecylamine |
| | Hydrocarbon group | C18 (unsaturated) | C18 (unsaturated) | C18 (unsaturated) | C18 (unsaturated) | C10 (saturated) | C10 (saturated) | C10 (saturated) | C12 (saturated) |
| Molar ratio in synthesis (acid/amine) | | 50/50 | 75/25 | 25/75 | 50/50 | 50/50 | 75/25 | 25/75 | 52/48 |
| Metal component (Main component) | | Cu | Cu | Cu | Ag | Ag | Ag | Ag | Ag |
| Average particle diameter (nm) | | 20.8 | 26.9 | 25.5 | 6.7 | 16.4 | 11.4 | 27.1 | 32.2 |
| Molar ratio in organic coating films (amine/acid) | | 0.002/1 | 0.001/1 | 0.004/1 | 0.001/1 | 0.03/1 | 0.03/1 | 0.06/1 | 0.26/1 |

As is apparent from the results shown in Table 6, it was found that the fine particles obtained in aforementioned Examples were fine particles (the surface-coated metal nanoparticles of the present invention) comprising the organic coating film containing 0.001 to 0.06 moles of the aliphatic amine per mole of the fatty acid on a surface of each of the metal nanoparticles. In addition, as shown in Table 6, even when the metal component in the metal nanoparticles was changed, even when the number of carbon atoms of the hydrocarbon group was changed, and/or even when the molar ratio of fatty acid/aliphatic amine in synthesis was changed, the content of the aliphatic amine in the organic coating film was in a range of 0.001 to 0.2 moles per mole of the fatty acid. Hence, it is conceivable that the content of the aliphatic amine in the organic coating film of the fine particles obtained in the other Examples was also in the range of 0.001 to 0.2 moles per mole of the fatty acid.

Figure 18:
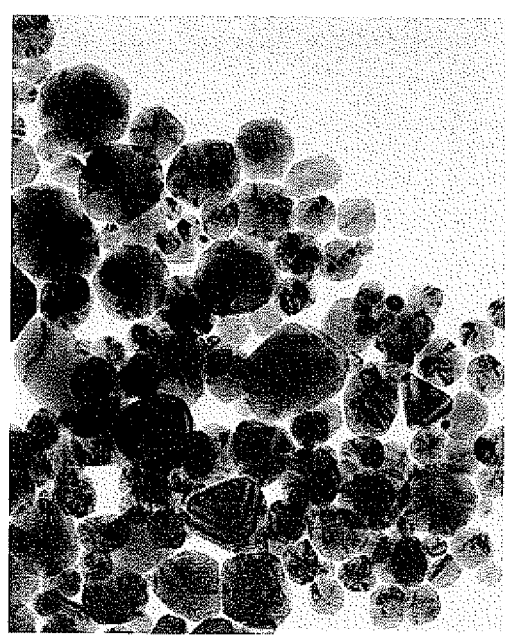
FIG. 18 is a transmission electron microphotograph showing the fine particles obtained in Example 5.
Figure 19:
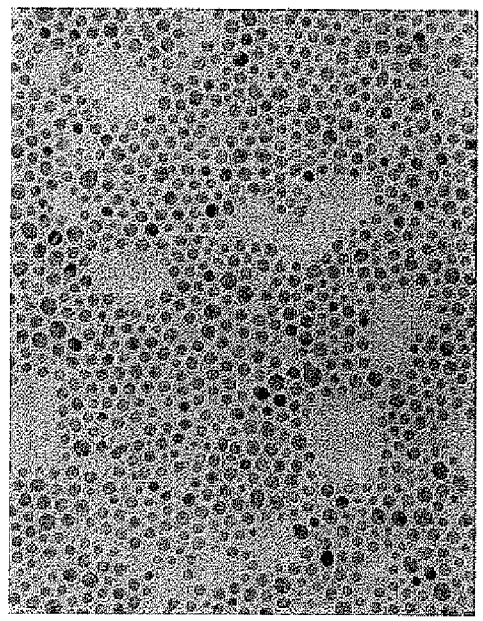
FIG. 19 is a transmission electron microphotograph showing the fine particles obtained in Example 13.

Meanwhile, it was found that, when a metal salt was reduced in the presence of both a fatty acid and an aliphatic a uniform particle diameter of approximately 20 nm, which was almost equal to the average particle diameter of the metal nanoparticles shown in Table 1. In addition, FIG. 18 shows a TEM photograph of the surface-coated metal nanoparticles obtained in Example 5. As is apparent from the result, it was found that the surface-coated metal nanoparticles obtained in Example 5 had a uniform particle diameter of approximately 60 nm, which was almost equal to the average particle diameter of the metal nanoparticles shown in Table 1. Moreover, FIG. 19 shows a TEM photograph of the surface-coated metal nanoparticles obtained in Example 13. As is apparent from the result, it was found that the surface-coated metal nanoparticles obtained in Example 13 had a uniform particle diameter of approximately 7 nm, which was almost equal to the average particle diameter of the metal nanoparticles shown in Table 3.

Figure 20:
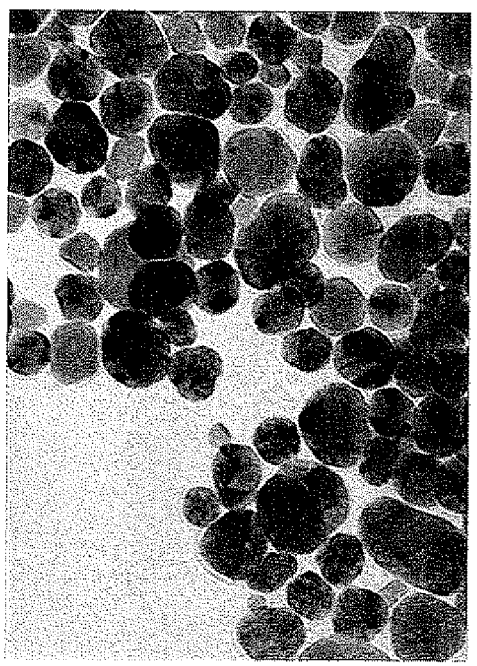
FIG. 20 is a transmission electron microphotograph showing the fine particles obtained in Comparative Example 4.

Meanwhile, FIG. 20 shows a TEM photograph of the fine particles obtained in Comparative Example 4. As is apparent from the result, it was found that the fine particles obtained by reducing the metal salt in the presence of both the fatty acid and the aliphatic amine without using an alcohol-based solvent had non-uniform particle diameters of approximately 20 to 40 nm.

<Dispersibility>

When 1 mg of the fine particles obtained in Examples 1 to 23 (i.e., the surface-coated metal nanoparticles of the present invention) were added to 10 ml of toluene, which is a lipophilic solvent, the fine particles were easily dispersed uniformly. In contrast, when the coarse precipitate obtained in Comparative Examples 1 and 3 was added to toluene, it was difficult to uniformly disperse the precipitate.

<Pyrolysis Characteristics>

By use of a thermogravimetry-differential thermal analyzer (TG-DTA, manufactured by Rigaku Corporation), 50 mg of the obtained fine particles were subjected to TG-DTA measurement under an argon stream of 100 ml/min with a temperature rise at a rate of 20 K/min from room temperature to 500° C.

Figure 21:
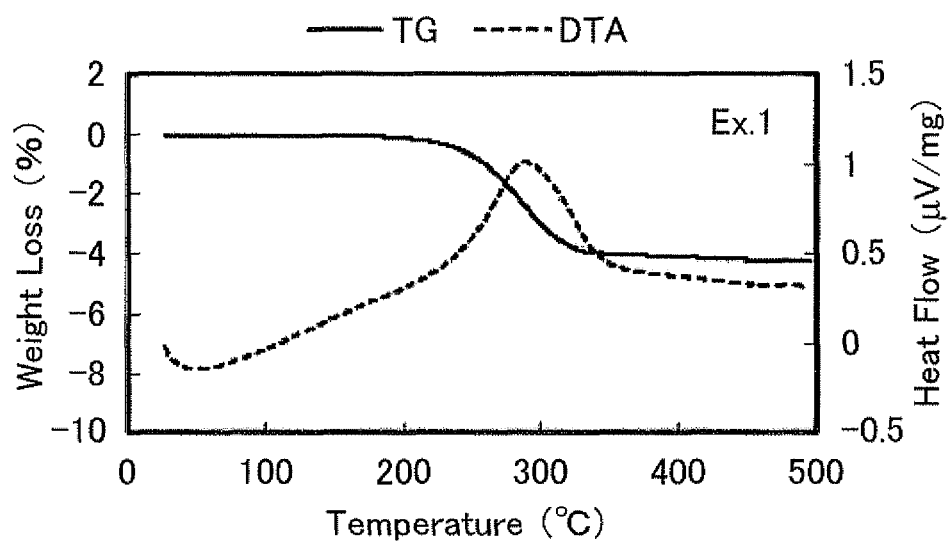
FIG. 21 is a graph showing results of TG-DTA measurement of the fine particles obtained in Example 1.
Figure 22:
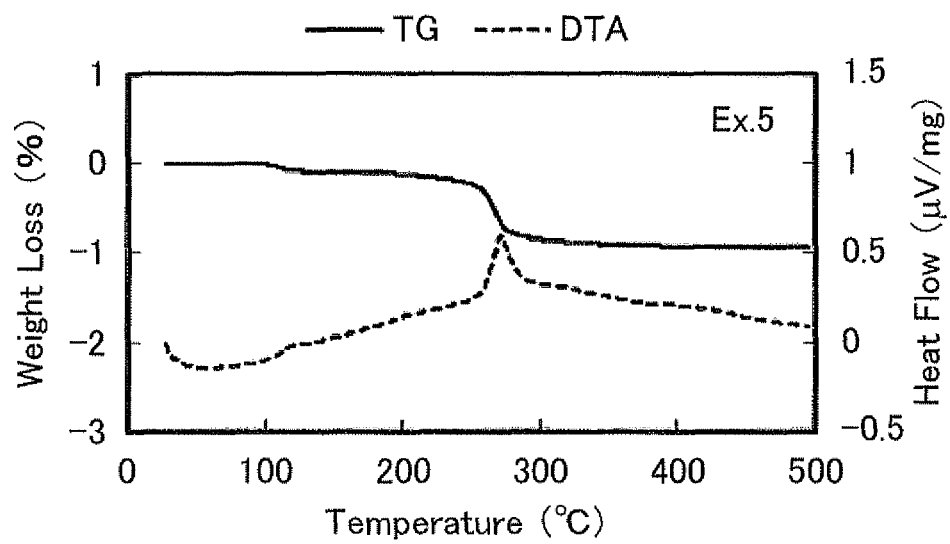
FIG. 22 is a graph showing results of TG-DTA measurement of the fine particles obtained in Example 5.
Figure 23:
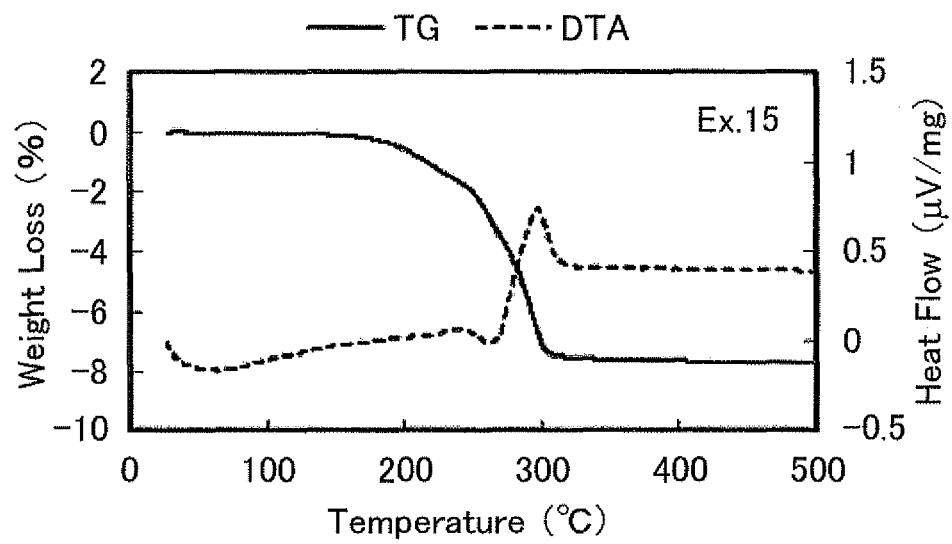
FIG. 23 is a graph showing results of TG-DTA measurement of the fine particles obtained in Example 15.
Figure 24:
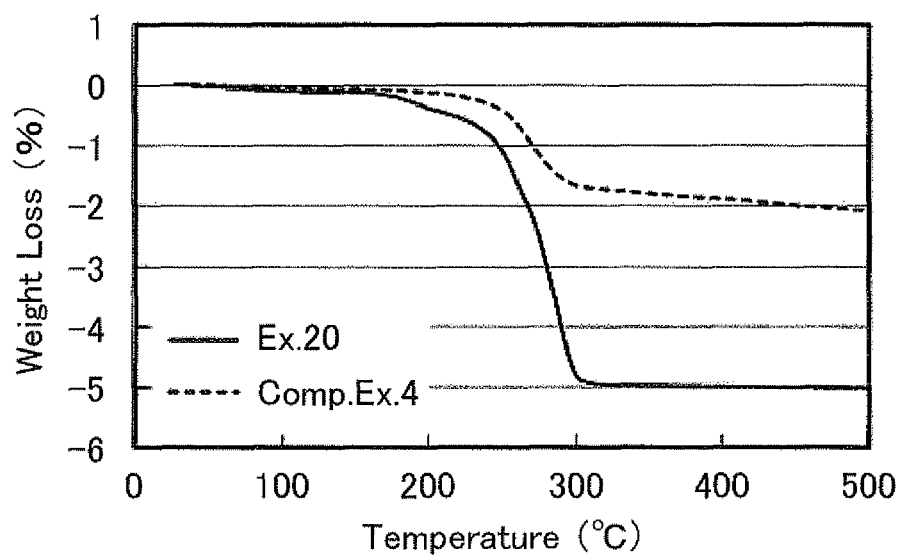
FIG. 24 is a graph showing results of TG measurement of the fine particles obtained in Example 20 and Comparative Example 4.
Figure 25:
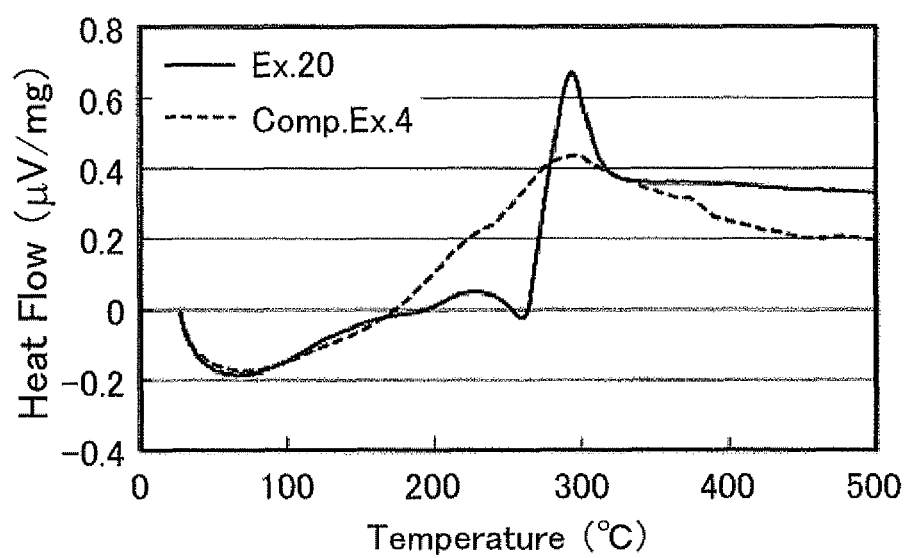
FIG. 25 is a graph showing results of DTA measurement of the fine particles obtained in Example 20 and Comparative Example 4.

As a result, it was found that, in the cases of the fine particles obtained in Examples 1 to 23 (i.e., the surface-coated metal nanoparticles of the present invention), the organic coating film was almost completely pyrolyzed (90% by mass or more) during the temperature rise from room temperature to 350° C. In contrast, in the case of the fine particles obtained in Comparative Example 4, the organic coating film was insufficiently pyrolyzed when the temperature was raised to 350° C. For example, FIGS. 21 to 23 show the results of the TG-DTA measurement of the surface-coated metal nanoparticles obtained in Examples 1, 5, and 15, and FIGS. 24 and 25 show the results of the TG measurement and the DTA measurement of the fine particles obtained in Example 20 and Comparative Example 4. As is apparent from these results, for the surface-coated metal nanoparticles obtained in Examples 1, 5, 15, and 20, a sharp exothermic peak was observed at 250 to 300° C., and 94% or more of the weight decreased during the temperature rise to 500° C. (corresponding to the mass of the organic coating film) was decreased during the temperature rise to 350° C. In contrast, for the fine particles obtained in Comparative Example 4, the exothermic peak was broad, and the weight decreased during the temperature rise to 350° C. was 87% of the weight decreased during the temperature rise to 500° C. (corresponding to the mass of the organic coating film).

<Application Properties of Paste>

To 100 parts by mass of the fine particles obtained in Examples 1, 4 to 6, and 16 (i.e., the surface-coated metal nanoparticles of the present invention), 12 parts by mass of ricinoleic acid or α-terpineol was added. Thus, each metal nanoparticle paste was prepared. The obtained metal nanoparticle paste was applied in a region of a diameter of 5 mm in a thickness of 0.15 mm by use of a metal mask. A metal nanoparticle paste which was uniformly applied onto the applied region was graded as "A", and a metal nanoparticle paste failed to be uniformly applied was graded as "B". Table 7 shows the results.

TABLE 7

|  |  | Ex. 1 | Ex. 4 | Ex. 5 | Ex. 6 | Ex. 16 |
|---|---|---|---|---|---|---|
| Metal component (Main component) |  | Cu | Cu | Cu | Cu | Ag |
| Average particle diameter (nm) |  | 20.8 | 26.6 | 66 | 71.5 | 16.4 |
| Fatty acid | Kind | Oleic acid | Dodecanoic acid | Decanoic acid | Octanoic acid | Decanoic acid |
|  | Hydrocarbon group | C18 (unsaturated) | C12 (saturated) | C10 (saturated) | C8 (saturated) | C10 (saturated) |
| Aliphatic amine | Kind | Oleylamine | Dodecylamine | Decylamine | Octylamine | Decylamine |
|  | Hydrocarbon group | C18 (unsaturated) | C12 (saturated) | C10 (saturated) | C8 (saturated) | C10 (saturated) |
| Application properties | Ricinoleic acid | A | A | A | A | A |
|  | α-Terpineol | B | B | A | A | A |

As is apparent from the results shown in Table 7, when ricinoleic acid was used, each metal nanoparticle paste in which the fatty acid and the aliphatic amine in the organic coating film had 8 to 18 carbon atoms could be applied in a favorable manner. In contrast, when α-terpineol was used, the metal nanoparticle paste in which the fatty acid and the aliphatic amine in the organic coating film had 8 to 10 carbon atoms could be applied in a favorable manner, but it is difficult to uniformly apply the metal nanoparticle paste in which the fatty acid and the aliphatic amine had 12 or more carbon atoms. Although the reason for this is not exactly clear, the present inventor speculates as follows. Specifically, since α-terpineol is hydrophilic, α-terpineol is likely to be uniformly mixed with metal nanoparticles coated with a fatty acid and an aliphatic amine which have a hydrocarbon group having 8 to 10 carbon atoms and thus having a relatively low lipophilicity. However, α-terpineol is not likely to be uniformly mixed with metal nanoparticles coated with a fatty acid and an aliphatic amine which have a hydrocarbon group having 12 or more carbon atoms and thus having a high lipophilicity.

In contrast, ricinoleic acid is an aliphatic hydroxy acid having a lipophilic hydrocarbon group having 17 carbon atoms and hydrophilic functional groups (a hydroxyl group and a carboxyl group). Hence, the present inventor speculate that ricinoleic acid is likely to be uniformly mixed with both metal nanoparticles coated with a fatty acid and an aliphatic amine which have a hydrocarbon group having a relatively low lipophilicity and metal nanoparticles coated with a fatty acid and an aliphatic amine which have a hydrocarbon group having a high lipophilicity.

<Bonding Strength Measurement>

To 100 parts by mass of the fine particles obtained in Examples 1, 4 to 6, 8, 9, 11 to 13, 15 to 17, and 19 to 21 and Comparative Example 4, 12 parts by mass of ricinoleic acid was added. Thus, each metal nanoparticle paste was prepared. The metal nanoparticle paste was applied onto a surface of a copper plate (22 mm×10 mm, 3 mm in thickness) in a region of a diameter of 5 mm in a thickness of 0.15 mm by use of a metal mask. A copper member (5 mm in diameter, 2 mm in thickness) was placed on the film of the paste. Then, the copper plate and the copper member were bonded by applying a pressure at 5 MPa through an upper portion of the copper member for 5 minutes in an argon atmosphere at 300° C. or 350° C. Thus, a test piece for bonding strength measurement was prepared. Three test pieces were prepared for each metal nanoparticle paste and for each bonding temperature. Note that the copper plate and the copper member were subjected in advance to an electrolytic polishing treatment by applying a voltage of 2 V thereto for 5 minutes in a mixture solution of 250 ml of phosphoric acid and 10 ml of sulfuric acid to thereby remove the surficial oxidized film, and then washed with distilled water prior to use.

A load in a direction parallel to a surface of the copper plate was applied to a side surface of the copper member of the test piece at a shear rate of 1 mm/min, and a maximum load at break was measured. The maximum load was divided by the bonding area (5 mm in diameter) to thereby determine the bonding strength (shear strength). The bonding strengths of the three test pieces were measured for each metal nanoparticle paste and for each bonding temperature, and the average value thereof was calculated. Tables 8 and 9 show the results.

300° C., and was 2.5 MPa at a bonding temperature of 350° C. Although it is not exactly clear why the use of the surface-coated metal nanoparticles of the present invention leads to the increase in bonding strength, the present inventor speculates as follows. Specifically, in the surface-coated metal nanoparticles of the present invention, the content of the aliphatic amine which is difficult to be pyrolyzed in an inert gas atmosphere at a temperature of 350° C. or below was extremely small in the organic coating film. Hence, even when the bonding temperature was 300° C. or 350° C., the organic coating film was almost completely pyrolyzed, and components other than the metal nanoparticles were less likely to remain in the bonding portion. By contrast, in the fine particles obtained in Comparative Example 4, the aliphatic amine was contained in the organic coating film in an amount of more than 0.2 moles per mole of the fatty acid. Hence, it is speculated that the organic coating film was insufficiently pyrolyzed in an inert gas atmosphere at 300° C. or 350° C., and components other than the metal nanoparticles remained in the bonding portion.

Note that ricinoleic acid is pyrolyzed at 200° C. into undecylenic acid (boiling point: 275° C.) and heptaldehyde (boiling point: 153° C.) as represented by the following formula:

TABLE 8

| | | Ex. 1 | Ex. 4 | Ex. 5 | Ex. 6 | Ex. 8 | Ex. 9 | Ex. 11 | Ex. 12 |
|---|---|---|---|---|---|---|---|---|---|
| Metal component (Main component) | | Cu | Cu | Cu | Cu | Cu | Cu | Cu | Cu |
| Average particle diameter (nm) | | 20.8 | 26.6 | 66 | 71.5 | 26.9 | 25.5 | 59.5 | 76.8 |
| Fatty acid | Kind | Oleic acid | Dodecanoic acid | Decanoic acid | Octanoic acid | Oleic acid | Oleic acid | Decanoic acid | Decanoic acid |
| | Hydrocarbon group | C18 (unsaturated) | C12 (saturated) | C10 (saturated) | C8 (saturated) | C18 (unsaturated) | C18 (unsaturated) | C10 (saturated) | C10 (saturated) |
| Aliphatic amine | Kind | Oleylamine | Dodecylamine | Decylamine | Octylamine | Oleylamine | Oleylamine | Decylamine | Decylamine |
| | Hydrocarbon group | C18 (unsaturated) | C12 (saturated) | C10 (saturated) | C8 (saturated) | C18 (unsaturated) | C18 (unsaturated) | C10 (saturated) | C10 (saturated) |
| Bonding strength (MPa) | 300° C. | 13.3 | 11.6 | 26.0 | 15.6 | 12.6 | 14.5 | 32.0 | 32.4 |
| | 350° C. | 19.4 | 16.3 | 25.4 | 14.9 | 13.4 | 18.5 | 28.3 | 29.2 |

TABLE 9

| | | Ex. 13 | Ex. 15 | Ex. 16 | Ex. 17 | Ex. 19 | Ex. 20 | Ex. 21 | Comp. Ex. 4 |
|---|---|---|---|---|---|---|---|---|---|
| Metal component (Main component) | | Ag | Ag | Ag | Ag | Ag | Ag | Ag | Ag |
| Average particle diameter (nm) | | 6.7 | 8.5 | 16.4 | 74.4 | 11.4 | 27.1 | 75.1 | 32.2 |
| Fatty acid | Kind | Oleic acid | Dodecanoic acid | Decanoic acid | Octanoic acid | Decanoic acid | Decanoic acid | Decanoic acid | Octanoic acid |
| | Hydrocarbon group | C18 (unsaturated) | C12 (saturated) | C10 (saturated) | C8 (saturated) | C10 (saturated) | C10 (saturated) | C10 (saturated) | C8 (saturated) |
| Aliphatic amine | Kind | Oleylamine | Dodecylamine | Decylamine | Octylamine | Decylamine | Decylamine | Decylamine | Dodecylamine |
| | Hydrocarbon group | C18 (unsaturated) | C12 (saturated) | C10 (saturated) | C8 (saturated) | C10 (saturated) | C10 (saturated) | C10 (saturated) | C12 (saturated) |
| Bonding strength (MPa) | 300° C. | 12.5 | 18.5 | 29.6 | 11.2 | 28.2 | 31.9 | 25.6 | 5.4 |
| | 350° C. | 28.9 | 25.4 | 32.5 | 13.2 | 31.5 | 30.7 | 27.3 | 2.5 |

As is apparent from the results shown in Tables 8 and 9, when the copper plate and the copper member were bonded by use of the fine particles obtained in Examples 1, 4 to 6, 8, 9, 11 to 13, 15 to 17, and 19 to 21 (i.e., the surface-coated metal nanoparticles of the present invention), the bonding strength was in the range of 11.2 to 34.2 MPa at a bonding temperature of 300° C. and was in the range of 13.2 to 32.5 MPa at a bonding temperature of 350° C. In contrast, when the fine particles obtained in Comparative Example 4, the bonding strength was 5.4 MPa at a bonding temperature of

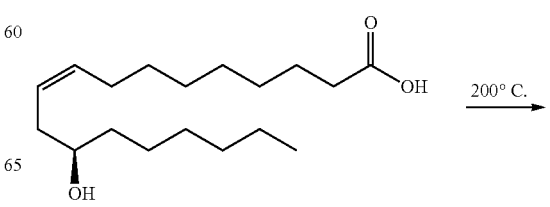

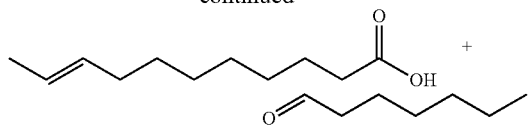

Hence, when the bonding is conducted at 300° C. or 350° C. as described above, ricinoleic acid in the metal nanoparticle paste is pyrolyzed, and the pyrolysis product is easily vaporized. As a result, components other than the metal nanoparticles are less likely to remain in the bonding portion. It is presumed that this is also a factor for the increase in bonding strength achieved by the use of the metal nanoparticle paste.

As described above, the present invention makes it possible to obtain surface-coated metal nanoparticles comprising metal nanoparticles capable of being sintered by a heat treatment in an inert gas atmosphere at 350° C. or below, and an organic coating film which is easily pyrolyzed by the heat treatment.

Accordingly, the surface-coated metal nanoparticles of the present invention can be sintered in an inert gas atmosphere at low-temperature. Hence, the surface-coated metal nanoparticles are useful as a material which allows bonding and wiring formation at low-temperature, for example, in the cases of bonding electrodes of a semiconductor device, of forming fine-pitch wiring in which a semiconductor device is provided, and the like.

What is claimed is:

1. Surface-coated metal nanoparticles comprising:
    metal nanoparticles having an average particle diameter of 1 to 100 nm, and
    an organic coating film provided on a surface of each of the metal nanoparticles,
        wherein
        the organic coating film comprises a fatty acid having 8 or more carbon atoms and an aliphatic amine having 8 or more carbon atoms, and
        a molar ratio of the aliphatic amine to the fatty acid is aliphatic amine/fatty acid from 0.001/1 to 0.2/1.

2. The surface-coated metal nanoparticles according to claim 1, wherein the metal nanoparticles comprise at least one metal atom selected from the group consisting of Au, Pt, Pd, Ag, Rh, Cu, Bi, Ph, Sn, and Ni.

3. The surface-coated metal nanoparticles according to claim 1, wherein 90% by mass or more of the organic coating film is pyrolyzed in an inert gas atmosphere at a temperature of 350° C. or below.

4. The surface-coated metal nanoparticles according to claim 1, wherein
    the metal nanoparticles comprise at least one metal atom selected from the group consisting of Au, Pt, Pd, Ag, Rh, Cu, Bi, Pb, Sn, and Ni, and
    90% by mass or more of the organic coating film is pyrolyzed in an inert gas atmosphere at a temperature of 350° C. or below.

5. A metal nanoparticle paste comprising:
    the surface-coated metal nanoparticles according to claim 1, and
    an aliphatic hydroxy acid which is liquid at normal temperature.

6. The metal nanoparticle paste according to claim 5, wherein the aliphatic hydroxy acid is ricinoleic acid.

7. The surface-coated metal nanoparticles according to claim 1, wherein the surface-coated metal nanoparticles are produced by reducing a metal salt in an alcohol-based solvent in the presence of both a fatty acid having 8 or more carbon atoms and an aliphatic amine having 8 or more carbon atoms, the metal salt being insoluble in the alcohol-based solvent.

8. The surface-coated metal nanoparticles according to claim 7, wherein the metal nanoparticles comprise at least one metal atom selected from the group consisting of Cu and Ni.

9. A method for producing the surface-coated metal nanoparticles of claim 1, comprising:
    reducing a metal salt in an alcohol-based solvent in the presence of both a fatty acid having 8 or more carbon atoms and an aliphatic amine having 8 or more carbon atoms, the metal salt being insoluble in the alcohol-based solvent, to thereby form nanoparticles of the metal, and
    forming an organic coating film on the surface of each of the metal nanoparticles, the organic coating film comprising the fatty acid and the aliphatic amine.

10. The method for producing surface-coated metal nanoparticles according to claim 9, wherein the metal salt is at least one selected from the group consisting of carbonates and hydroxides of the metal.

11. The method for producing surface-coated metal nanoparticles according to claim 9, wherein the metal salt is a salt of at least one metal selected from the group consisting of Au, Pt, Pd, Ag, Rh, Cu, Bi, Pb, Sn, and Ni.

12. The method for producing surface-coated metal nanoparticles according to claim 9, wherein
    the metal salt is at least one selected from the group consisting of carbonates and hydroxides of the metal, and
    the metal is at least one selected from the group consisting of Au, Pt, Pd, Ag, Rh, Cu, Bi, Pb, Sn, and Ni.

13. The method for producing surface-coated metal nanoparticles according to claim 9, wherein a molar ratio between the fatty acid and the aliphatic amine present in the alcohol-based solvent is fatty acid/aliphatic amine from 10/90 to 90/10.

14. The method for producing surface-coated metal nanoparticles according to claim 9, wherein the alcohol-based solvent is a polyol.

15. The method for producing surface-coated metal nanoparticles according to claim 14, wherein the polyol is a glycol.

16. The method for producing surface-coated metal nanoparticles according to claim 15, wherein the glycol is at least one glycol selected from the group consisting of ethylene glycol, diethylene glycol, triethylene glycol, and polyethylene glycol.

17. The method for producing surface-coated metal nanoparticles according to claim 14, wherein a molar ratio between the fatty acid and the aliphatic amine present in the polyol is fatty acid/aliphatic amine from 10/90 to 90/10.

18. The method for producing surface-coated metal nanoparticles according to claim 15, wherein a molar ratio between the fatty acid and the aliphatic amine present in the glycol is fatty acid/aliphatic amine from 10/90 to 90/10.

* * * * *

UNITED STATES PATENT AND TRADEMARK OFFICE
CERTIFICATE OF CORRECTION

PATENT NO. : 8,764,913 B2
APPLICATION NO. : 13/211791
DATED : July 1, 2014
INVENTOR(S) : Toshitaka Ishizaki It is certified that error appears in the above-identified patent and that said Letters Patent is hereby corrected as shown below:

In the Claims

Claim 2, Column 25, line 44, "Ph" should read --Pb--.

Signed and Sealed this
Twenty-eighth Day of October, 2014

Michelle K. Lee
*Deputy Director of the United States Patent and Trademark Office*